United States Patent
Igarashi

(10) Patent No.: US 11,644,783 B2
(45) Date of Patent: May 9, 2023

(54) IMAGE FORMING APPARATUS THAT ADJUSTS IMAGE FORMING AREA BASED ON READ TEST IMAGE

(71) Applicant: CANON KABUSHIKI KAISHA, Tokyo (JP)

(72) Inventor: Hiroya Igarashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/379,010

(22) Filed: Jul. 19, 2021

(65) Prior Publication Data
US 2021/0341868 A1 Nov. 4, 2021

Related U.S. Application Data

(63) Continuation of application No. 16/549,251, filed on Aug. 23, 2019, now Pat. No. 11,099,512, which is a
(Continued)

(30) Foreign Application Priority Data

Mar. 2, 2017 (JP) ............................. JP2017-039704
Feb. 26, 2018 (JP) ............................. JP2018-031751

(51) Int. Cl.
*G03G 15/00* (2006.01)
*H04N 1/00* (2006.01)

(52) U.S. Cl.
CPC ..... *G03G 15/5062* (2013.01); *G03G 15/5016* (2013.01); *G03G 15/5095* (2013.01);
(Continued)

(58) Field of Classification Search
CPC .......... G03G 15/5062; G03G 15/5016; G03G 15/5095; G03G 2215/00734; G03G 2215/047; H04N 1/00816
See application file for complete search history.

(56) References Cited

U.S. PATENT DOCUMENTS 7,583,282 B2 9/2009 Yamauchi
7,800,796 B2 9/2010 Saito
(Continued)

FOREIGN PATENT DOCUMENTS

JP     H1169099 A     3/1999
JP     2003173109 A   6/2003
(Continued)

OTHER PUBLICATIONS

International Search Report issued in Intl. Appln. No PCT/JP2018/007101 dated May 15, 2018 English translation provided.
(Continued)

*Primary Examiner* — Walter L Lindsay, Jr.
*Assistant Examiner* — Milton Gonzalez
(74) *Attorney, Agent, or Firm* — Rossi, Kimms & McDowell LLP

(57) ABSTRACT

Provided is an image forming apparatus including a printer controller configured to form an image on a sheet, a storage unit configured to store a plurality of adjustment conditions for adjusting a position on the sheet at which the image is to be formed, and a CPU. The CPU selects one of the plurality of adjustment conditions, adjusts the position at which the image is to be formed based on the selected adjustment condition, and causes the printer controller to form the image on the sheet.

16 Claims, 22 Drawing Sheets

Related U.S. Application Data continuation of application No. PCT/JP2018/007101, filed on Feb. 27, 2018.

(52) U.S. Cl.
CPC ............. *H04N 1/00816* (2013.01); *G03G 2215/00734* (2013.01); *G03G 2215/047* (2013.01)

(56) References Cited

U.S. PATENT DOCUMENTS

| | | | |
|---|---|---|---|
| 2007/0291327 A1 | 12/2007 | Saito | |
| 2011/0304886 A1 | 12/2011 | Hoover | |
| 2013/0155428 A1* | 6/2013 | Mizuno | G03G 15/5062 358/1.9 |
| 2013/0278945 A1 | 10/2013 | Ono | |
| 2014/0169843 A1* | 6/2014 | Igarashi | G03G 15/5058 399/301 |
| 2015/0286901 A1* | 10/2015 | Yano | H04N 1/29 358/3.24 |
| 2017/0052468 A1 | 2/2017 | Omura | |

FOREIGN PATENT DOCUMENTS

| | | |
|---|---|---|
| JP | 2005221582 A | 8/2005 |
| JP | 2007334250 A | 12/2007 |
| JP | 2017040693 A | 2/2017 |

OTHER PUBLICATIONS

Written Opinion issued in Intl. Appln. No. PCT/JP2018/007101 dated May 15, 2018.
Office Action issued in U.S. Appl. No. 16/549,251 dated Oct. 7, 2020.
Notice of Allowance issued in U.S. Appl. No. 16/549,251 dated Apr. 21, 2021.

* cited by examiner

EDIT SHEET LIBRARY

| SHEET NAME | WIDTH (mm) | LENGTH (mm) | BASIS WEIGHT (g/m^2) | SURFACE PROPERTY | COLOR |
|---|---|---|---|---|---|
| ABC PAPER RECYCLE 1 | 210 | 297 | 75 | PLAIN SHEET | WHITE |
| ABC PAPER RECYCLE 2 | 297 | 420 | 75 | PLAIN SHEET | WHITE |
| DEF PAPER EMBOSSED PAPER A-1 | 216 | 279 | 150 | EMBOSSED | WHITE |
| DEF PAPER COATED SHEET P-1 | 279 | 452 | 128 | DOUBLE-SIDE -COATED | WHITE |
| XYZ PAPER COLOR B1 | 210 | 297 | 75 | PLAIN SHEET | ORANGE |
| XYZ PAPER COLOR B2 | 210 | 297 | 75 | PLAIN SHEET | PINK |

ADD NEW SHEET | EDIT | DELETE | ADJUST PRINT POSITION

FIG. 11

| | 1211 | 1212 | 1213 | 1214 | 1215 | 1216 | 1217 PRINT POSITION MISALIGNMENT AMOUNT WHEN MEASUREMENT IS PERFORMED USING SCANNER (FRONT SURFACE) | 1218 PRINT POSITION MISALIGNMENT AMOUNT WHEN MEASUREMENT IS PERFORMED USING SCANNER (BACK SURFACE) | 1219 PRINT POSITION MISALIGNMENT AMOUNT WHEN MEASUREMENT IS PERFORMED USING READING DEVICE (FRONT SURFACE) | 1220 PRINT POSITION MISALIGNMENT AMOUNT WHEN MEASUREMENT IS PERFORMED USING READING DEVICE (BACK SURFACE) | 1221 |
|---|---|---|---|---|---|---|---|---|---|---|---|
| | SHEET NAME | WIDTH (mm) | LENGTH (mm) | BASIS WEIGHT (g/m^2) | SURFACE PROPERTY | COLOR | NUMBER OF SHEETS n | | | | |
| 1201 | ABC PAPER RECYCLE 1 | 210 | 297 | 75 | PLAIN PAPER | WHITE | 1 | PERPENDICULARITY CORRECTION AMOUNT: 0.23mm<br>KEYSTONE CORRECTION AMOUNT: 0.71mm<br>LEAD POSITION: 0.30mm<br>SIDE POSITION: -0.1mm<br>MAINSCANNING MAGNIFICATION: +0.02%<br>SUB-SCANNING MAGNIFICATION: -0.01% | PERPENDICULARITY CORRECTION AMOUNT: 0.27mm<br>KEYSTONE CORRECTION AMOUNT: 0.55mm<br>LEAD POSITION: 0.20mm<br>SIDE POSITION: 0.10mm<br>MAINSCANNING MAGNIFICATION: +0.02%<br>SUB-SCANNING MAGNIFICATION: -0.03% | KEYSTONE CORRECTION AMOUNT: 0.73mm<br>LEAD POSITION: 0.30mm<br>SIDE POSITION: -0.1mm<br>MAINSCANNING MAGNIFICATION: -0.01%<br>SUB-SCANNING MAGNIFICATION: -0.01% | KEYSTONE CORRECTION AMOUNT: 0.51mm<br>LEAD POSITION: 0.20mm<br>SIDE POSITION: -0.1mm<br>MAINSCANNING MAGNIFICATION: +0.02%<br>SUB-SCANNING MAGNIFICATION: +0.02% |
| 1202 | ABC PAPER RECYCLE 2 | 297 | 420 | 75 | PLAIN PAPER | WHITE | 1 | PERPENDICULARITY CORRECTION AMOUNT: 0.00mm<br>KEYSTONE CORRECTION AMOUNT: 0.00mm<br>LEAD POSITION: 0.00mm<br>SIDE POSITION: 0.00mm<br>MAINSCANNING MAGNIFICATION: +0.00%<br>SUB-SCANNING MAGNIFICATION: +0.00% | PERPENDICULARITY CORRECTION AMOUNT: 0.00mm<br>KEYSTONE CORRECTION AMOUNT: 0.00mm<br>LEAD POSITION: 0.00mm<br>SIDE POSITION: 0.00mm<br>MAINSCANNING MAGNIFICATION: +0.00%<br>SUB-SCANNING MAGNIFICATION: +0.00% | KEYSTONE CORRECTION AMOUNT: 0.00mm<br>LEAD POSITION: 0.00mm<br>SIDE POSITION: 0.00mm<br>MAINSCANNING MAGNIFICATION: +0.00%<br>SUB-SCANNING MAGNIFICATION: +0.00% | KEYSTONE CORRECTION AMOUNT: 0.00mm<br>LEAD POSITION: 0.00mm<br>SIDE POSITION: 0.00mm<br>MAINSCANNING MAGNIFICATION: +0.00%<br>SUB-SCANNING MAGNIFICATION: +0.00% |
| 1203 | DEF PAPER EMBOSSED PAPER A-1 | 216 | 279 | 170 | EMBOSSED PAPER | WHITE | 2 | PERPENDICULARITY CORRECTION AMOUNT: -0.45mm<br>KEYSTONE CORRECTION AMOUNT: 0.41mm<br>LEAD POSITION: 0.50mm<br>SIDE POSITION: -0.50mm<br>MAINSCANNING MAGNIFICATION: +0.02%<br>SUB-SCANNING MAGNIFICATION: -0.02% | PERPENDICULARITY CORRECTION AMOUNT: 0.08mm<br>KEYSTONE CORRECTION AMOUNT: 0.29mm<br>LEAD POSITION: -0.30mm<br>SIDE POSITION: 0.50mm<br>MAINSCANNING MAGNIFICATION: -0.01%<br>SUB-SCANNING MAGNIFICATION: -0.03% | KEYSTONE CORRECTION AMOUNT: 0.41mm<br>LEAD POSITION: 0.50mm<br>SIDE POSITION: -0.50mm<br>MAINSCANNING MAGNIFICATION: +0.02%<br>SUB-SCANNING MAGNIFICATION: +0.02% | KEYSTONE CORRECTION AMOUNT: 0.29mm<br>LEAD POSITION: 0.30mm<br>SIDE POSITION: -0.50mm<br>MAINSCANNING MAGNIFICATION: +0.01%<br>SUB-SCANNING MAGNIFICATION: +0.03% |
| 1204 | DEF PAPER COATED PAPER P-1 | 279 | 432 | 128 | DOUBLE-SIDE-COATED | WHITE | 2 | PERPENDICULARITY CORRECTION AMOUNT: 0.11mm<br>KEYSTONE CORRECTION AMOUNT: -0.21mm<br>LEAD POSITION: 0.40mm<br>SIDE POSITION: 0.20mm<br>MAINSCANNING MAGNIFICATION: +0.12%<br>SUB-SCANNING MAGNIFICATION: +0.08% | PERPENDICULARITY CORRECTION AMOUNT: 0.41mm<br>KEYSTONE CORRECTION AMOUNT: -0.31mm<br>LEAD POSITION: -0.20mm<br>SIDE POSITION: 0.60mm<br>MAINSCANNING MAGNIFICATION: +0.02%<br>SUB-SCANNING MAGNIFICATION: -0.01% | KEYSTONE CORRECTION AMOUNT: -0.23mm<br>LEAD POSITION: 0.40mm<br>SIDE POSITION: 0.20mm<br>MAINSCANNING MAGNIFICATION: +0.13%<br>SUB-SCANNING MAGNIFICATION: +0.09% | KEYSTONE CORRECTION AMOUNT: -0.32mm<br>LEAD POSITION: 0.20mm<br>SIDE POSITION: 0.60mm<br>MAINSCANNING MAGNIFICATION: +0.03%<br>SUB-SCANNING MAGNIFICATION: +0.01% |
| 1205 | XYZ PAPER COLOR 81 | 210 | 297 | 75 | PLAIN PAPER | ORANGE | 1 | PERPENDICULARITY CORRECTION AMOUNT: 0.00mm<br>KEYSTONE CORRECTION AMOUNT: 0.00mm<br>LEAD POSITION: 0.00mm<br>SIDE POSITION: 0.00mm<br>MAINSCANNING MAGNIFICATION: +0.00%<br>SUB-SCANNING MAGNIFICATION: +0.00% | PERPENDICULARITY CORRECTION AMOUNT: 0.00mm<br>KEYSTONE CORRECTION AMOUNT: 0.00mm<br>LEAD POSITION: 0.00mm<br>SIDE POSITION: 0.00mm<br>MAINSCANNING MAGNIFICATION: +0.00%<br>SUB-SCANNING MAGNIFICATION: +0.00% | KEYSTONE CORRECTION AMOUNT: 0.00mm<br>LEAD POSITION: 0.00mm<br>SIDE POSITION: 0.00mm<br>MAINSCANNING MAGNIFICATION: +0.00%<br>SUB-SCANNING MAGNIFICATION: +0.00% | KEYSTONE CORRECTION AMOUNT: 0.00mm<br>LEAD POSITION: 0.00mm<br>SIDE POSITION: 0.00mm<br>MAINSCANNING MAGNIFICATION: +0.00%<br>SUB-SCANNING MAGNIFICATION: +0.00% |

FIG. 12

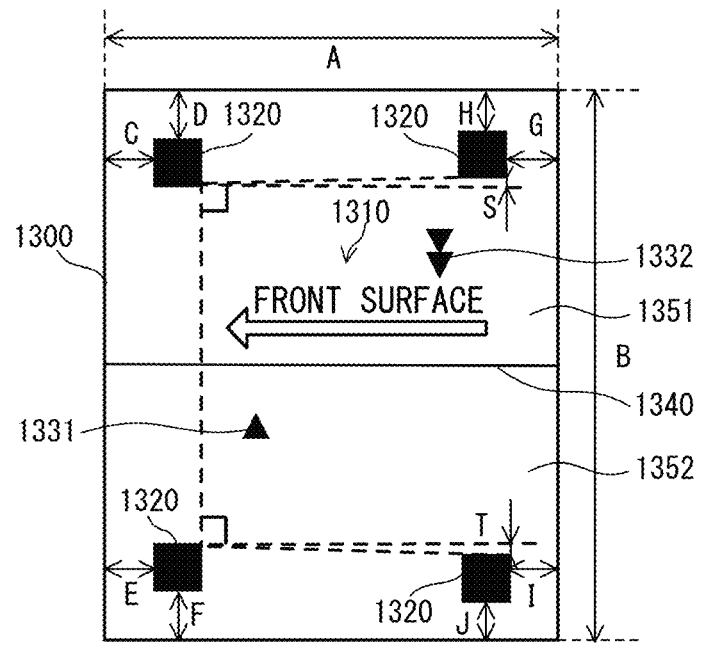
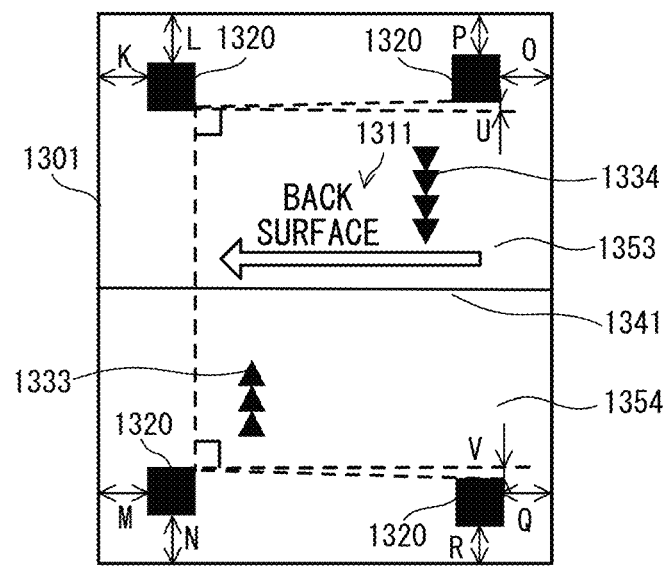
FIG. 13

|  | MEASUREMENT VALUE (1520) | IDEAL VALUE (1521) | PRINT POSITION MISALIGNMENT AMOUNT (1522) |
|---|---|---|---|
| 1501 LEAD POSITION (FRONT SURFACE) | (C+E)/2 | 1cm | MEASUREMENT VALUE − IDEAL VALUE |
| 1502 SIDE POSITION (FRONT SURFACE) | (F+J)/2 | 1cm | IDEAL VALUE − MEASUREMENT VALUE |
| 1503 MAIN SCANNING MAGNIFICATION (FRONT SURFACE) | ((D−F)+(H−J))/2 | LENGTH 2cm | (IDEAL VALUE − MEASUREMENT VALUE) / MEASUREMENT VALUE |
| 1504 SUB-SCANNING MAGNIFICATION (FRONT SURFACE) | ((C−G)+(E−I))/2 | WIDTH−2cm | (IDEAL VALUE − MEASUREMENT VALUE) / MEASUREMENT VALUE |
| 1505 PERPENDICULARITY CORRECTION AMOUNT (FRONT SURFACE) | (S+T)/2 | 0cm | IDEAL VALUE |
| 1506 KEYSTONE CORRECTION AMOUNT (FRONT SURFACE) | ((D−F)+(H−J)) | 0cm | IDEAL VALUE |
| 1507 LEAD POSITION (BACK SURFACE) | (K+M)/2 | 1cm | IDEAL VALUE − MEASUREMENT VALUE |
| 1508 SIDE POSITION (BACK SURFACE) | (N+R)/2 | 1cm | IDEAL VALUE − MEASUREMENT VALUE |
| 1509 MAIN SCANNING MAGNIFICATION (BACK SURFACE) | ((L−N)+(P−R))/2 | LENGTH−2cm | (IDEAL VALUE − MEASUREMENT VALUE) / MEASUREMENT VALUE |
| 1510 SUB-SCANNING MAGNIFICATION (BACK SURFACE) | ((K−O)+(M−Q))/2 | WIDTH−2cm | (IDEAL VALUE − MEASUREMENT VALUE) / MEASUREMENT VALUE |
| 1511 PERPENDICULARITY CORRECTION AMOUNT (BACK SURFACE) | (U+V)/2 | 0cm | IDEAL VALUE |
| 1512 KEYSTONE CORRECTION AMOUNT (BACK SURFACE) | ((L−N)+(P−R)) | 0cm | IDEAL VALUE |

FIG. 15

IMAGE FORMING APPARATUS THAT ADJUSTS IMAGE FORMING AREA BASED ON READ TEST IMAGE

CROSS-REFERENCE TO RELATED APPLICATIONS

This application is a Continuation of International Patent Application No. PCT/JP2018/007101, filed Feb. 27, 2018, which claims the benefit of Japanese Patent Application No. 2017-039704, filed Mar. 2, 2017 and Japanese Patent Application No. 2018-031751, filed Feb. 26, 2018, all of which are hereby incorporated by reference herein in their entirety.

BACKGROUND OF THE INVENTION

Field of the Invention

The present disclosure relates to a technology for adjusting an image formation area (print position) in which an image can be formed.

Background Art

In an image forming apparatus of recent years, a position of an image to be formed on a sheet and a shape of the image are required to be more accurate. However, due to abrasion of a conveying member configured to convey the sheet, a change in environment (temperature or humidity), or a change in a moisture content of the sheet, a size of the image to be formed on the sheet varies, the image rotates, or the image is distorted. Under a state in which the image to be formed on the sheet is at a position different from an ideal position, a character or letter image formed on a preprint sheet having ruled lines printed thereon in advance overlaps the ruled lines. Additionally, under a state in which a shape of the image to be formed on the sheet is different from a predetermined shape, misalignment occurs between an image formed on a front surface of the sheet and an image formed on a back surface of the sheet. Moreover, at a joint between images formed on facing pages, misalignment between the images becomes clearly visible.

To correct the position and shape of the image to be formed on the sheet, an image forming apparatus has a function of adjusting an image formation area in which an image can be formed. For example, an image forming apparatus described in Japanese Patent Laid-Open No. 2003-173109 includes a scanner configured to read an original and adjust an image formation area based on a result of reading with the scanner a reference image formed on a sheet. Meanwhile, for example, an image forming apparatus described in Japanese Patent Laid-Open No. 2005-221582 includes a reading sensor along a conveyance path for conveying a sheet and adjusts an image formation area based on a result of reading a pattern image with the sensor.

CITATION LIST

Patent Literature

PTL 1 Japanese Patent Laid-Open No. 2003-173109
PTL 2 Japanese Patent Laid-Open No. 2005-221582

However, depending on a type of printed materials, it may be impossible to appropriately adjust the image formation area. When the printed material is to be cut, the image forming apparatus is required to correct the image formation area into a rectangular shape. Meanwhile, when the printed material is a full-page printed material, the image forming apparatus is required to correct the image formation area such that each of margins of the sheet having the image formed thereon has a predetermined width. However, depending on the printed material, it may be impossible to appropriately adjust a print position.

SUMMARY OF THE INVENTION

According to at least one embodiment of the present disclosure, there is provided an image forming apparatus including: an image forming unit configured to form an image on a sheet; and a controller configured to: cause the image forming unit to form a test image on the sheet; obtain read data, which is obtained by reading the test image formed on the sheet; and control a predetermined image formation area, in which the image forming unit is able to form an image, based on the read data. The controller is configured to perform a first adjustment process of adjusting the predetermined image formation area to a first area and a second adjustment process of adjusting the predetermined image formation area to a second area. The first area has a rectangular shape, and the second area has a shape similar to a shape of the sheet having the test image formed thereon.

Further features of the present invention will become apparent from the following description of exemplary embodiments with reference to the attached drawings.

BRIEF DESCRIPTION OF THE DRAWINGS

FIG. 11 is a diagram for illustrating an example of an interface screen for performing an operation on a sheet library.
FIG. 12 is an explanatory diagram of the sheet library.
FIG. 13 is an explanatory diagram of adjustment charts.
FIG. 15 is an explanatory diagram of a process of determining print position misalignment amounts.

DESCRIPTION OF THE EMBODIMENTS

Now, with reference to the drawings, at least one embodiment of the present disclosure is described in detail.

Configuration of Printing System

Figure 1:
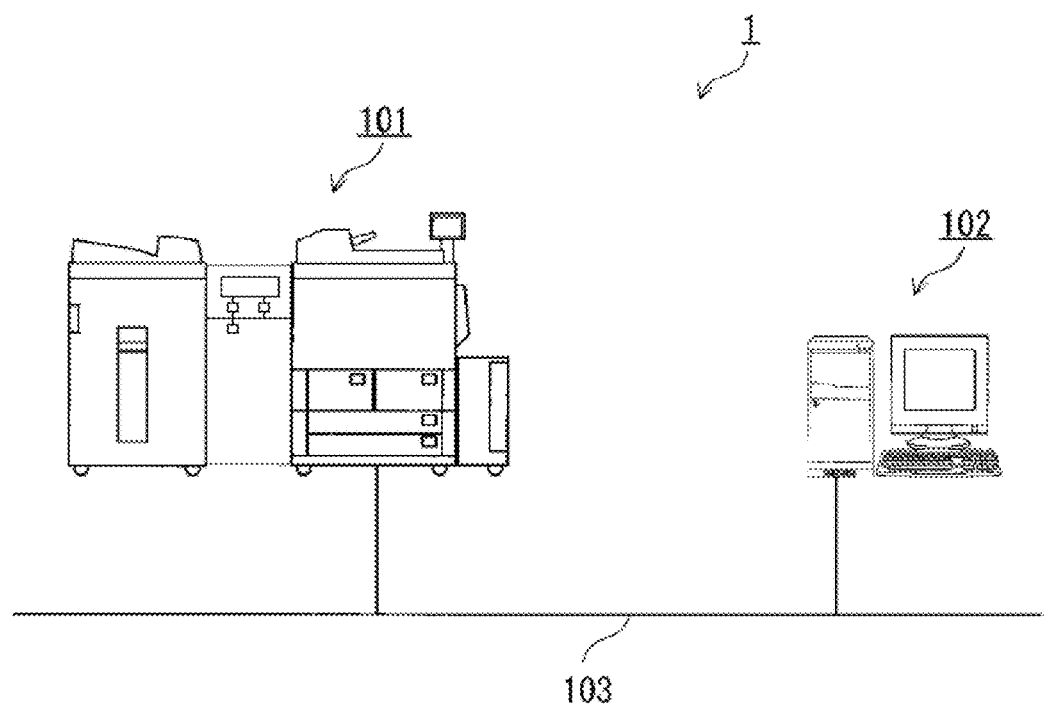
FIG. 1 is an overall configuration diagram of a printing system.

FIG. 1 is an overall configuration diagram of a printing system including an image forming apparatus according to at least one embodiment of the present disclosure. A printing system 1 includes an image forming apparatus 101 and an information processing apparatus 102. The image forming apparatus 101 and the information processing apparatus 102 are connected to be communicative to/from each other via a network 103. The information processing apparatus 102 is, for example, a server. The information processing apparatus 102 performs job management and processes such as raster image processor (RIP) processing and imposition and transmits a print job to the image forming apparatus 101.

Figure 2:
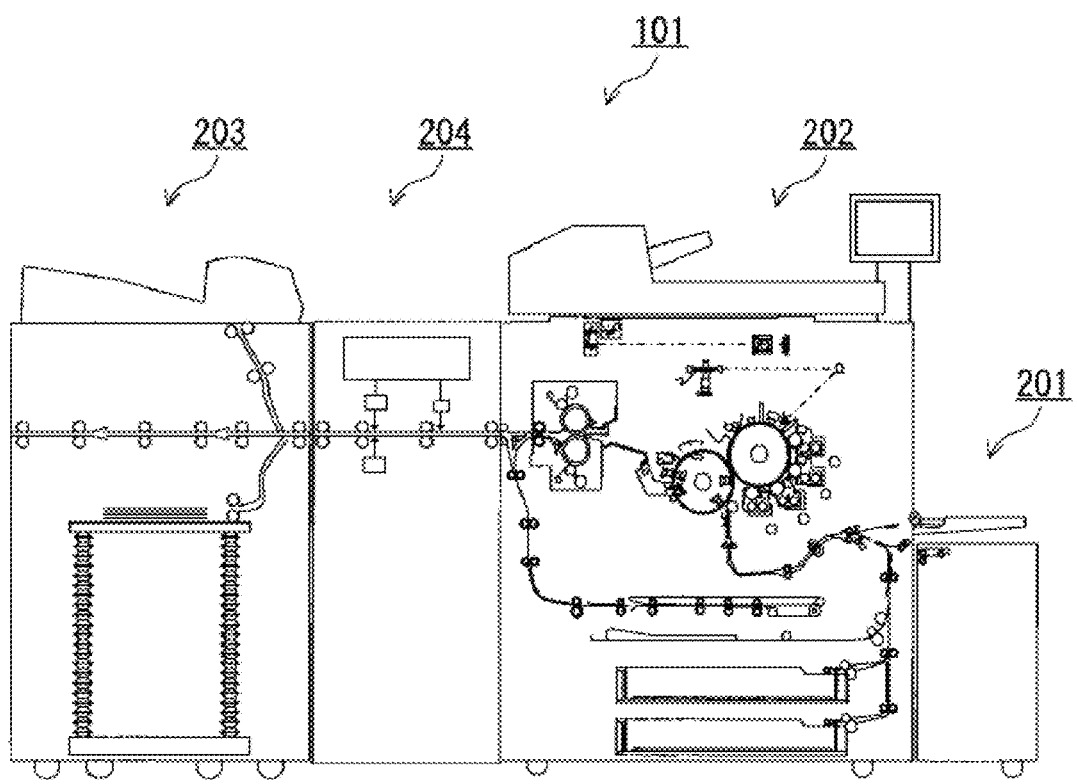
FIG. 2 is a configuration diagram of an image forming apparatus according to at least one embodiment of the present disclosure.

FIG. 2 is a configuration diagram of the image forming apparatus 101. The image forming apparatus 101 includes a sheet feeder 201, a printer 202, a stacker 203, and a reading device 204 (sensing device).

The sheet feeder 201 can contain a large number of sheets (for example, 3,000 sheets). The sheet feeder 201 feeds the sheets to the printer 202. The printer 202 forms an image in accordance with the print job on each of the sheets, to thereby perform printing. To the printer 202, the sheets are fed not only from the sheet feeder 201, but also from an associated sheet cassette. The use of the sheet feeder 201 allows the printer 202 to perform printing a large number of sheets without interruption. The stacker 203 is a delivery device configured to allow a large number of printed materials resulting from image formation on the sheets in the printer 202 to be accumulated therein in such a manner as to follow an instruction given by the print job. The stacker 203 is used mainly when large-volume printing using the sheet feeder 201 is performed. The reading device 204 reads adjustment charts described later, which are printed for the adjustment of an image formation area (print position), from a printed material delivered from the printer 202. The adjustment charts are used to sense print position misalignment. A result of the reading (read data) is used for print position adjustment described later.

Figure 3:
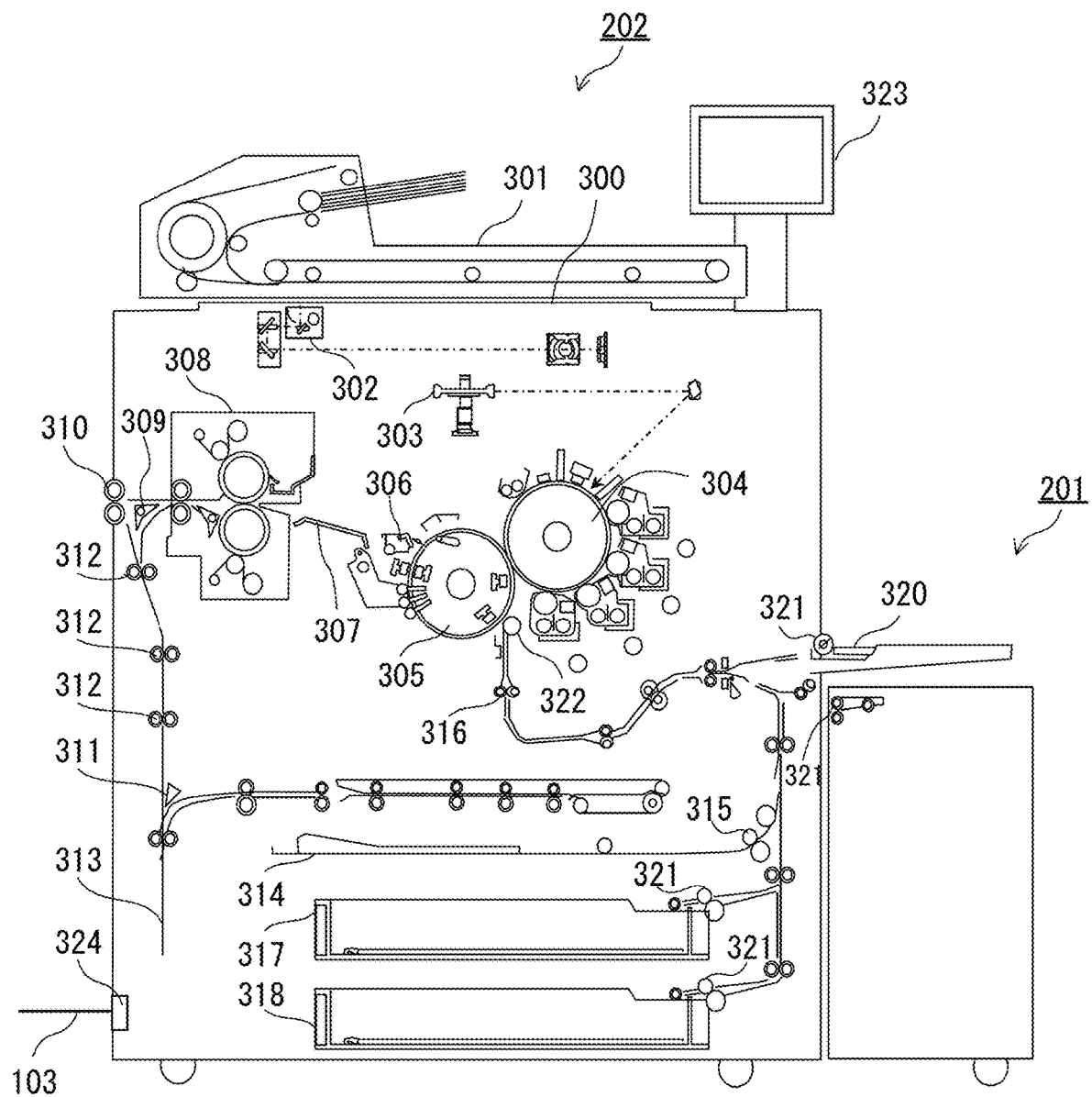
FIG. 3 is an explanatory diagram of a printer.

FIG. 3 is an explanatory diagram of the printer 202. The printer 202 includes an auto document feeder (ADF) 301, a scanner 302, and an operation panel 323. The printer 202 is not necessarily configured to include the ADF 301, the scanner 302, and the operation panel 323.

The ADF 301 conveys, on a one-by-one basis, each of originals in a stack of originals placed on an original tray to a reading position of the scanner 302. The scanner 302 reads an original image from each of the originals conveyed by the ADF 301 to generate original image data (image data corresponding to the original image). The scanner 302 also reads the original image from each of the originals placed on an original table 300 to generate the original image data.

The printer 202 includes a photosensitive drum 304, on which a toner image is to be formed, a transfer drum 305 serving as an intermediate transfer member configured to transfer the toner image formed on the photosensitive drum 304 onto each of the sheets, and a fixing device 308 configured to fix the toner image to the sheet.

The photosensitive drum 304 is a drum-shaped photosensitive member and has a surface on which the toner images are to be formed by a charging device, an exposing device 303, and developing devices. The photosensitive drum 304 rotates clockwise in FIG. 3. The photosensitive drum 304 has a surface thereof uniformly charged by the charging device and irradiated with a laser beam from the exposing device 303 to have an electrostatic latent image formed on the surface. The exposing device 303 irradiates the photosensitive drum 304 with the laser beam modulated in accordance with the image data to form the electrostatic latent image in accordance with the image data on the photosensitive drum 304. The developing devices cause toner to be deposited on the electrostatic latent image formed on the photosensitive drum 304 to develop the electrostatic latent image, to thereby form the toner image on the surface of the photosensitive drum 304. The developing devices are provided individually for yellow (Y), magenta (M), cyan (C), and black (K) colors.

The transfer drum 305 rotates in a direction opposite to the direction of rotation of the photosensitive drum 304, while holding the sheet. To the sheet held by the transfer drum 305, the toner image having one of the colors is transferred every time the transfer drum 305 rotates once. A sequential image formation process from the charging of the photosensitive drum 304 to the transfer of the toner image is repeated four times to allow a full-color toner image to be formed on the sheet. The sheet having the toner image formed thereon is removed from the transfer drum 305 by a separation claw 306 and conveyed to the fixing device 308 via a conveyance path 307.

The fixing device 308 includes a combination of rollers and belts, and has a heat source, for example, a halogen heater, embedded therein. The fixing device 308 applies heat and pressure to the sheet having the toner image transferred thereon to fix the toner image to the sheet. The sheet delivered from the fixing device 308 is conveyed to a flapper 309. The flapper 309 is configured to be swingable around a swing axis to change a direction in which the sheet is to be conveyed depending on a direction in which the flapper 309 swings. When the sheet is conveyed by the flapper 309 to rollers 310, the sheet is output by the rollers 310 to the outside of the image forming apparatus.

The printer 202 includes a sheet cassette 317, a sheet cassette 318, and a sheet tray 320 each configured to contain sheets to be used in the image formation process, a conveyance path, and a double-side conveying portion.

Feeding of the sheets is performed by the sheet cassettes 317 and 318, the sheet tray 320, and the sheet feeder 201. Each of the sheet cassettes 317 and 318 and the sheet feeder 201 can contain sheets of various sizes and various materials. The sheet tray 320 is configured such that various sheets including special sheets, for example OHP sheets, can be stacked thereon. Along the conveyance path, various rollers configured to convey the fed sheets are provided.

For the sheet cassettes 317 and 318, the sheet feeder 201, and the sheet tray 320, respective rollers 321 are provided. Each of the rollers 321 feeds each of the sheets on a one-by-one basis. The sheets contained in the sheet cassette 317 are sequentially fed out by a pick-up roller, and a separating roller provided to face the roller 321 prevents multi-feeding of stacked sheets. Thus, each of the sheets is fed out on a one-by-one basis to the conveyance path. To the separating roller, a drive force for rotating the separating roller in a direction opposite to the direction of conveyance is supplied via a torque limiter (not shown). When only one of the sheets has entered a nip portion formed between the separating roller and the roller 321, the separating roller rotates in a direction of conveyance while following the sheet. When the multi-feeding has occurred, the separating roller rotates in a direction opposite to the direction of conveyance to retract the multi-fed sheets. This process allows only one uppermost sheet to be fed.

The fed sheet is conveyed by a plurality of conveying rollers to registration rollers 316. At this time, the registration rollers 316 are stopped. The registration rollers include a pair of rollers. A leading end of the sheet abuts against a nip portion between the registration rollers 316 to correct skew feeding of the sheet. The registration rollers 316 start to rotate at a time when the toner image is formed on the photosensitive drum 304 to resume the conveyance of the sheet. The sheet conveyed by the registration rollers 316 is electrostatically adsorbed by an adsorbing roller 322 onto the surface of the transfer drum 305.

The double-side conveying portion is a conveyance path for conveying the sheet having a first surface (front surface) on which image formation has been completed when double-side printing is performed. The sheet having the toner image fixed thereto by the fixing device 308 is conveyed by the flapper 309 to the double-side conveying portion. The double-side conveying portion includes a flapper 311, rollers 312, a reverse guide 313, and a double-side tray 314. The flapper 311 is configured to be swingable around a swing axis, and changes the direction of conveyance of the sheet. In the case of double-side printing, the sheet having the image formed on the front surface is conveyed by the flapper 311 to the reverse guide 313. After a rear end of the sheet passes through the flapper 311, the rollers (not shown) provided in the reverse guide 313 temporarily stop. Subsequently, the flapper 311 swings clockwise in FIG. 3 to change a destination to which the sheet is to be conveyed to the double-side tray 314. Then, the rollers 312 rotate in the opposite direction. Thus, the sheet is switch-back conveyed. The sheet is conveyed to the double-side tray 314 under a state in which the rear and leading ends thereof have been switched.

On the double-side tray 314, the sheet is temporarily placed. The sheet placed on the double-side tray 314 is conveyed again to the registration rollers 316 by rollers 315. At this time, the sheet has a second surface (back surface) opposite to the first surface (front surface) facing the photosensitive drum 304. Then, on the back surface of the sheet, an image is formed by the same process as that performed on the front surface. The sheet having the images formed on both surfaces thereof is discharged by the rollers 310 to the outside of the image forming apparatus.

The operation panel 323 is a user interface including various operation buttons, a numeric keypad, a display device, for example, a liquid crystal display (LCD), a touch panel, and the like. An operator can input a command and print settings to the printer 202 via the operation panel 323. The operation panel 323 causes the display device to display a setting screen and a job status.

The printer 202 includes a network connector 324 for communication via the network 103. The network connector 324 has a shape in accordance with a communication interface.

The sheet feeder 201, the sheet cassettes 317 and 318, and the sheet tray 320 are supporting members configured to support sheets. Depending on from which one of the plurality of supporting members the sheet is fed, a surface of the sheet on which the image is to be formed in single-side printing is determined. Likewise, depending on from which one of the plurality of supporting members the sheet is fed, a front surface (first surface) on which a first image is to be formed in double-side printing is determined. The sheets contained in the sheet cassettes 317 and 318 are placed with print surfaces (front surfaces) thereof facing downward. The sheets contained in the sheet feeder 201 and the sheet tray 320 are placed with print surfaces (front surfaces) thereof facing upward. When a sheet for which it is required to pay attention to the orientations of the front and back surfaces thereof, for example a carbonless sheet, is to be fed, the user is required to pay attention to the print surfaces when placing the sheet.

Figure 4:
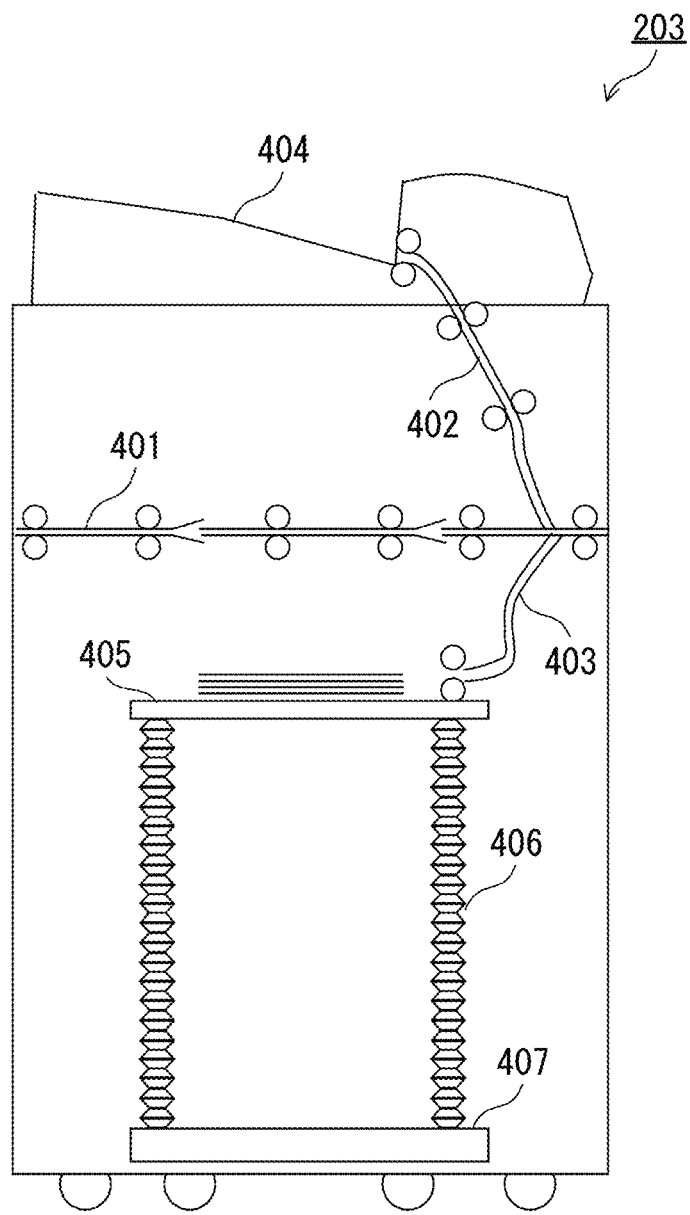
FIG. 4 is a configuration diagram of a stacker.

FIG. 4 is a configuration diagram of the stacker 203. The stacker 203 includes a straight path 401, an escape path 402, and a stack path 403 as conveyance paths. Along each of the conveyance paths, a plurality of sensors for detecting a situation in which the sheet is conveyed and a jam are provided.

The straight path 401 is a conveyance path for conveying the sheet discharged from the printer 202 to a device (post-processing device) in a subsequent stage (not shown). The escape path 402 is a conveyance path for outputting the sheet discharged from the printer 202 to an escape tray 404. For example, when an operation of checking a printed material (print check) or the like is performed, a sheet for the print check is output to the escape tray 404. The stack path 403 is a conveyance path for conveying the sheet discharged from the printer 202 to a stack tray 405. For example, when the print job requires a process of stacking printed materials, the sheets after printing (printed materials) are stacked on the stack tray 405.

The stack tray 405 is a stack unit placed over extendable stays 406. In joint portions between the stack tray 405 and the stays 406, shock absorbers or the like are provided. The stays 406 are provided on a wagon 407. To the wagon 407, a handle (not shown) is attached to allow the wagon 407 to carry the sheets stacked on the stack tray 405 to another offline finisher or the like. When a front door of the stacker 203 is closed, the stays 406 lift the stack tray 405 to a position at which the sheets are easily stacked. When the front door is opened, the stays 406 lower the stack tray 405 to allow the sheets to be easily retrieved.

Thus, the stacker 203 can allow a large number of printed materials to be stacked on the stack tray 405 and also allow a small number of printed materials for the print check or the like to be delivered to the escape tray 404.

Figure 5:
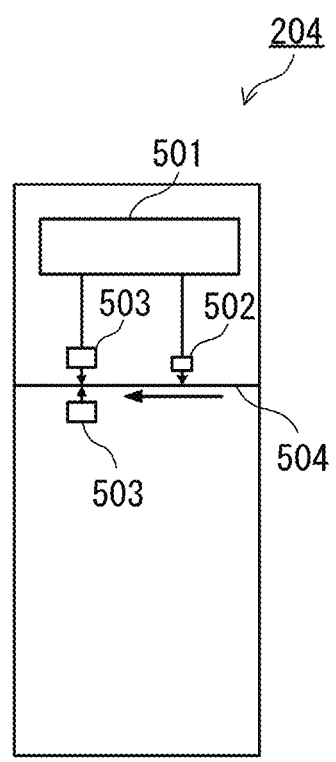
FIG. 5 is a configuration diagram of a reading device.

FIG. 5 is a configuration diagram of the reading device 204. The reading device 204 includes a reading controller 501, sheet detecting sensors 502, and line sensors 503. The reading device 204 reads a test image (hereinafter referred to as "adjustment chart") for print position adjustment, which is formed in the printer 202, while conveying the adjustment chart along a conveyance path 504. Details of the adjustment chart are described later.

Each of the sheet detecting sensors 502 detects the sheet conveyed along the conveyance path 504 in a direction of the arrow. The conveyance path 504 is formed of a black conveying belt. The adjustment chart is formed on a white sheet. Each of the sheet detecting sensors 502 detects a leading edge of the sheet in a direction of conveyance of the sheet. By conveying the white sheet over the black conveying belt, the accuracy of the detection of the sheet is improved.

The plurality of sheet detecting sensors 502 are provided in a direction perpendicular to the direction of conveyance of the sheet. Each of the sheet detecting sensors 502 detects the leading edge of the sheet and notifies the reading controller 501 of the detection of the leading edge. The reading controller 501 determines an amount of the skew feeding of the sheet based on the timing of the notification from each of the sheet detecting sensors 502 and on a speed of conveyance of the sheet. The reading controller 501 also controls the line sensors 503 through use of the notification from each of the sheet detecting sensors 502 as a trigger, and reads the images (adjustment charts) formed on the sheet. To simultaneously read both surfaces of the sheet, the two line sensors 503 are provided with the conveyance path 504 being interposed therebetween. The reading controller 501 transmits the angle of skew feeding of the sheet and image data representing the images read by the line sensors 503 to a control system described later, which is configured to control an operation of the printer 202.

Control System for Image Forming Apparatus 101

Figure 6:
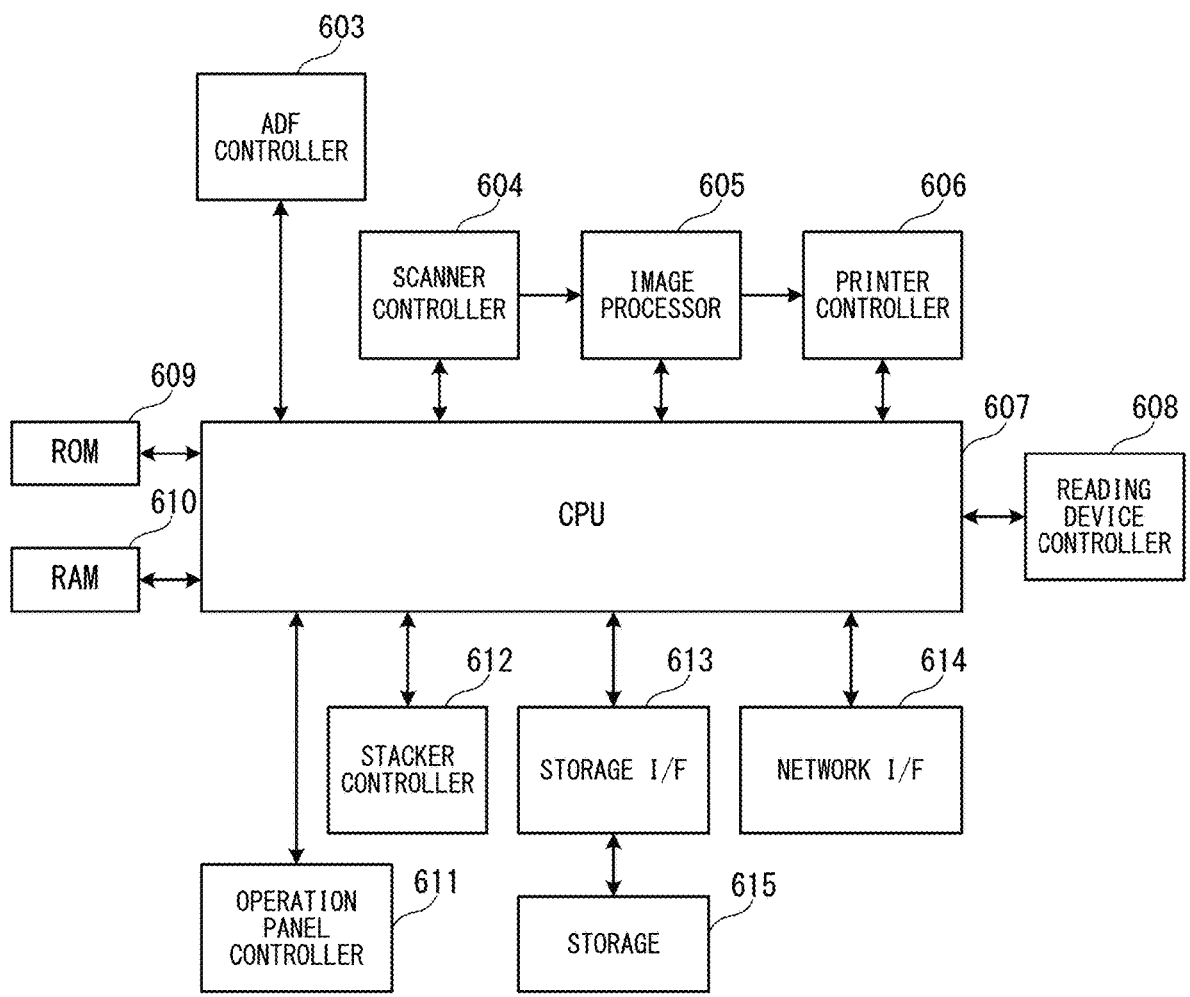
FIG. 6 is a hardware configuration diagram of a control system for the image forming apparatus.

FIG. 6 is a hardware configuration diagram of the control system for the image forming apparatus 101. The control system includes a central processing unit (CPU) 607, a read only memory (ROM) 609, and a random access memory (RAM) 610. The CPU 607 executes a program stored in the ROM 609 through use of the RAM 610 as a work area, to thereby control an operation of the image forming apparatus 101. To the CPU 607, an ADF controller 603, a scanner controller 604, an image processor 605, a printer controller 606, a reading device controller 608, an operation panel controller 611, and a stacker controller 612 are connected. Those components are configurations for controlling respective operations of the individual components of the image forming apparatus 101. To the CPU 607, a storage interface (I/F) 613 and a network interface (I/F) 614 are also connected. Such a control system can be implemented by, for example, a micro-processing unit (MPU), an application specific integrated circuit (ASIC), or a system-on-a-chip (SoC).

The ADF controller 603 controls an operation of the ADF 301. The ADF controller 603 causes the ADF 301 to convey an original to the reading position of the scanner 302. The scanner controller 604 controls an operation of the scanner 302. The scanner controller 604 causes the scanner 302 to read an original image and transmits original image data to the image processor 605. When the adjustment charts are read by the scanner 302, the scanner controller 604 transfers read data obtained by reading the adjustment charts to the CPU 607. When the original is read by the scanner 302, the image processor 605 performs image processing on the original image data obtained from the scanner controller 604 based on a predetermined image processing condition, and transmits the original image data to the printer controller 606. When the image data is transferred from the information processing apparatus 102 via the network 103, the image processor 605 performs image processing on the transferred image data, and transmits the image data to the printer controller 606. The printer controller 606 causes the printer 202 to print an image on a sheet based on the image data obtained from the image processor 605.

The reading device controller 608 controls an operation of the reading device 204 based on an instruction from the CPU 607. In print position adjustment described later, the reading device 204 uses the sheet detecting sensor 502 and the line sensors 503 to detect the edge of the sheet and read the adjustment charts. The reading device 204 transmits read data obtained by reading the adjustment charts to the CPU 607 via the reading device controller 608. The image forming apparatus 100 is capable of executing a mode in which the adjustment charts are read through use of the reading device 204 described above and a mode in which the adjustment charts are read through use of the scanner 302.

The operation panel controller 611 performs interface control between the operation panel 323 and the CPU 607. The operation panel controller 611 transmits to the CPU 607 data input thereto via the operation panel 323. The operation panel controller 611 also displays, based on the instruction from the CPU 607, an image of a setting screen or the like on the operation panel 323.

The stacker controller 612 controls an operation of the stacker 203. The stacker 203 outputs, based on an instruction from the stacker controller 612, each of the sheets output from the printer 202 to an output destination (escape tray 404 or stack tray 405) specified by the instruction.

The storage I/F 613 is connected to a large-capacity storage 615, such as a hard disk drive (HDD) or a solid state drive (SSD). The storage I/F 613 performs interface control between the storage 615 and the CPU 607. The CPU 607 writes data in the storage 615 via the storage I/F 613 or reads data from the storage 615 via the storage I/F 613. The network I/F 614 is an interface configured to control communication to/from an external apparatus (information processing apparatus 102) via the network 103. The printer 202 performs communication to/from the information processing apparatus 102 via the network I/F 614.

Control System for Information Processing Apparatus 102

Figure 7:
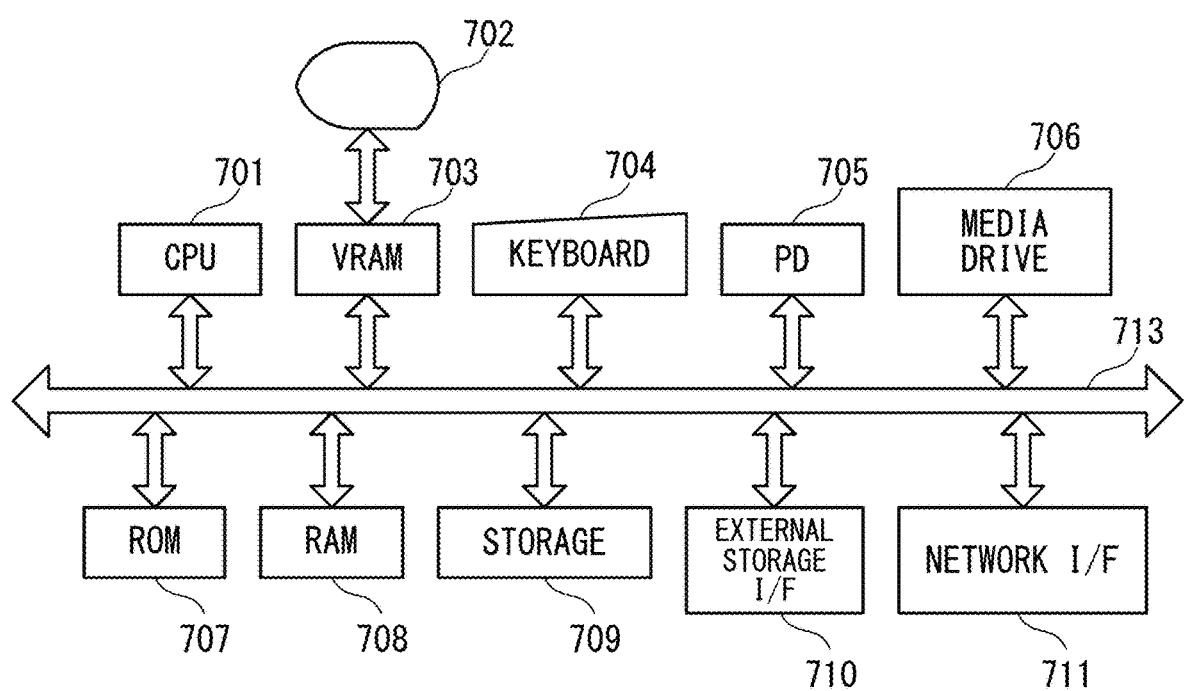
FIG. 7 is a hardware configuration diagram of a control system for an information processing apparatus.

FIG. 7 is a hardware configuration diagram of a control system for the information processing apparatus 102. The control system for the information processing apparatus 102 is a computer system including a CPU 701, a ROM 707, and a RAM 708. The CPU 701 executes a program stored in the ROM 707 through use of the RAM 708 as a work area, to thereby perform various processes in the information processing apparatus 102. The CPU 701, the ROM 707, and the RAM 708 are connected to be communicative to/from each other via a bus 713.

To the bus 713, a video random access memory (VRAM) 703 to be connected to a display device 702, a keyboard 704, and a pointing device (PD) 705 are connected. The display device 702, the keyboard 704, and the PD 705 are user interfaces. In the VRAM 703, the CPU 701 draws an image to be displayed on the display device 702. The image drawn in the VRAM 703 is transformed into a predetermined format, transmitted to the display device 702, and displayed thereon. The display device 702 displays, for example, a window, an icon, a message, a menu, and other user interface information. The keyboard 704 includes various keys for inputting characters. The keyboard 704 transmits a result of a key input to the CPU 701. The PD 705 is used to specify an object such as the icon or the menu to be displayed on a display screen of the display device 702. For example, the PD 705 is a mouse. The PD 705 transmits, to the CPU 701, the result of the specification.

To the bus 713, a media drive 706, a storage 709, and an external storage interface (I/F) 710 connected to an external storage device are connected. The media drive 706 is a device configured to read or write various control programs and data from and to media such as a compact disc (CD) and a DVD. The CPU 701 is allowed by the media drive 706 to access the media. The storage 709 is an internal storage device embedded in the information processing apparatus 102, such as an HDD or an SSD, and stores the various control programs and data. The CPU 701 can execute a computer program stored in the storage 709. The external storage I/F 710 is an interface configured to allow data to be read and written from and to the external storage device, for example, a universal serial bus (USB) memory. The CPU 701 is allowed by the external storage I/F 710 to access the media.

To the bus 713, a network interface (I/F) 711 is connected. The network I/F 711 is an interface configured to control communication to/from the external apparatus via the network 103. The information processing apparatus 102 communicates to/from the image forming apparatus 101 via the network I/F 614.

After being activated, the CPU 701 executes the control programs stored in the storage 709 and the media to cause the information processing apparatus 102 to implement various functions. For example, the information processing apparatus 102 implements a function of performing RIP processing on image data and transmitting the image data to the image forming apparatus 101.

Functional Configuration of Printing System 1

Figure 8:
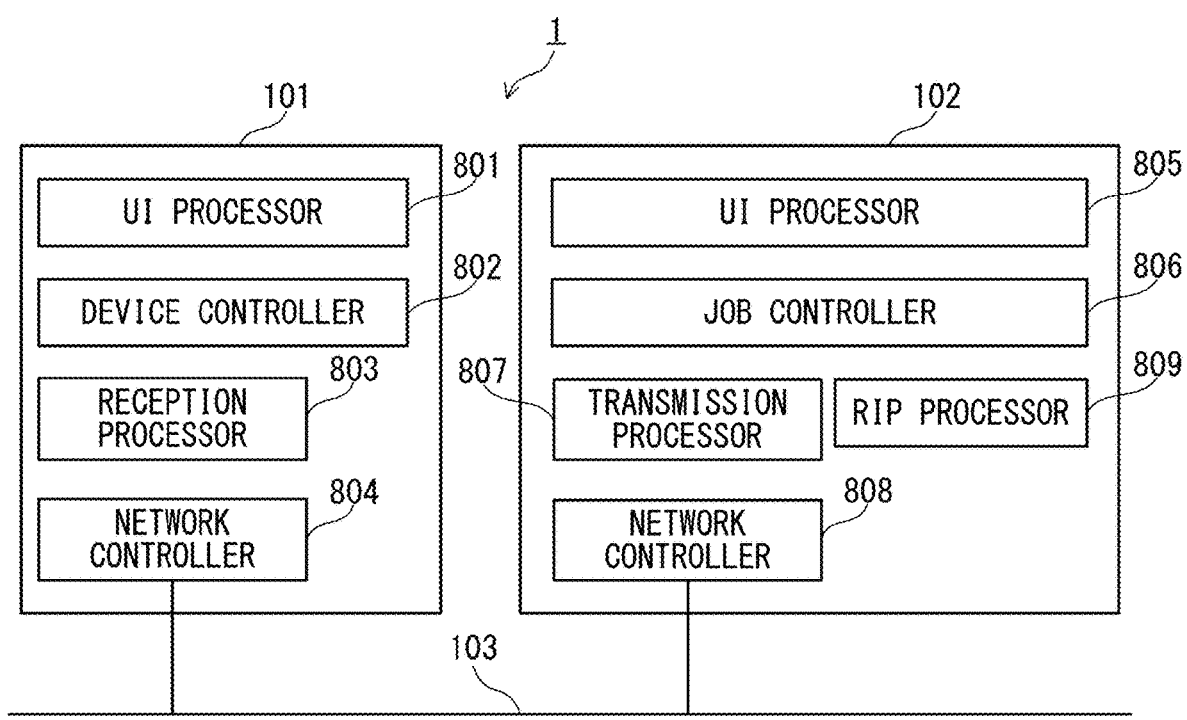
FIG. 8 is a functional configuration diagram of the printing system.

FIG. 8 is a functional configuration diagram of the printing system 1. Referring to FIG. 8, function of the information processing apparatus 102 causing the image forming apparatus 101 to perform image formation is described.

The execution of the computer program by the CPU 607 allows the image forming apparatus 101 to function as each of a user interface (UI) processor 801, a device controller 802, a reception processor 803, and a network controller 804.

The UI processor 801 receives input via the operation panel 323. The UI processor 801 also causes the operation panel 323 to display an image. For example, when the operation of the image forming apparatus 101 is to be set, the UI processor 801 causes the operation panel controller 611 to display a setting screen on the operation panel 323. The UI processor 801 uses the storage I/F 613 to store, in the storage 615, a set value input via the operation panel 323.

The device controller 802 causes the image forming apparatus 101 to perform processes such as an image formation process (printing) and device information setting management. For example, the reception processor 803 inputs, on a page basis, the image data after the RIP processing received from the information processing apparatus 102 via the network controller 804 to the device controller 802. The network controller 804 uses the network I/F 614 to communicate to/from the information processing apparatus 102 via the network 103.

The execution of the control program by the CPU 701 allows the information processing apparatus 102 to function as each of a UI processor 805, a job controller 806, a transmission processor 807, a network controller 808, and the RIP processor 809.

The UI processor 805 causes the display device 702 to display an image and also receives input via the keyboard 704 and the PD 705. The UI processor 805 causes, for example, a job management application screen to be displayed on the display device. The job management application is described later. The UI processor 805 receives job settings via the job management application screen, and inputs the job settings to the job controller 806.

The job controller 806 performs a process, for example, generation of a print job to be executed by the image forming apparatus 101. The transmission processor 807 transmits, on a page basis, the image data subjected to the RIP processing in the RIP processor 809 to the image forming apparatus 101 via the network controller 808. The network controller 808 uses the network I/F 711 to communicate to/from the image forming apparatus 101 via the network 103.

When the image data subjected to the RIP processing in the information processing apparatus 102 is to be printed in the image forming apparatus 101, the following process is performed.

The job controller 806 of the information processing apparatus 102 causes the RIP processor 809 to render the image data and causes the transmission processor 807 to transmit the image data subjected to the RIP processing to the image forming apparatus 101. The job controller 806 also causes the network controller 808 to transmit job setting information to the image forming apparatus 101. The job setting information is information including various settings related to, for example, the print job.

The device controller 802 of the image forming apparatus 101 inputs, to the image processor 605, the image data subjected to the RIP processing and obtained by the reception processor 803. The device controller 802 is also caused by the network controller 804 to receive the job setting information. The device controller 802 gives, to the printer controller 606, instructions relating to an output destination, a feeding source, and a condition for print position adjustment based on the job setting information. The device controller 802 also gives, to the image processor 605, an instruction to transmit the image data to the printer controller 606. At this time, in preparation for a case in which a print check request is input to the device controller 802 via the operation panel 323, the device controller 802 temporarily stores the image data in the storage 615. The device controller 802 deletes the image data from the storage 615 at a time when it is no longer required to store the image data, for example, when a job is completed.

Job Management Application

Figure 9:
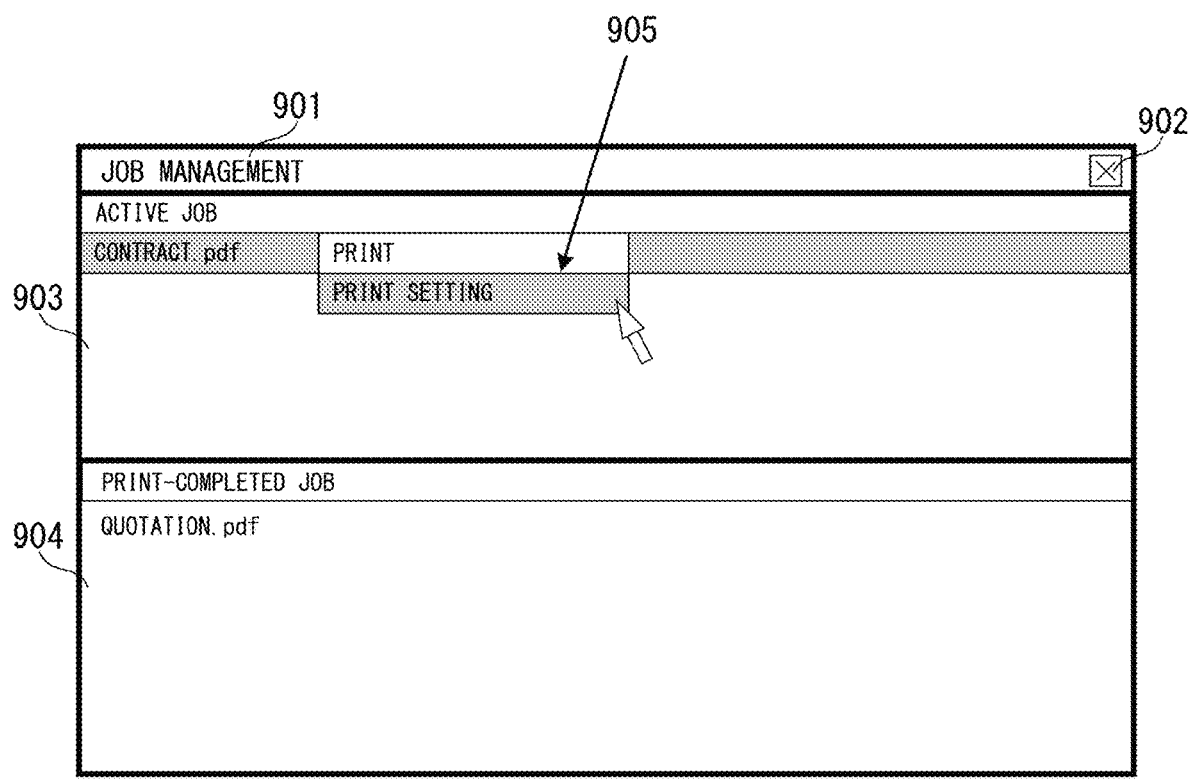
FIG. 9 is a diagram for illustrating an example of a job management application screen.

FIG. 9 is a diagram for illustrating an example of the job management application screen to be displayed on the display device 702 of the information processing apparatus 102. The job management application screen includes a name bar 901, an end button 902, an active window 903, and a job history window 904.

The name bar 901 displays a name of a job management application. The end button 902 is pressed when the job management application is to be ended. Through the pressing of the end button 902, the job management application is ended, and the job management application screen is closed.

The active window 903 is a display area for displaying a list of print jobs stored by the information processing apparatus 102. The active window 903 in this case displays a print job named "CONTRACT.pdf" stored by the information processing apparatus 102. In association with the job displayed in the active window 903, a property 905 for executing "PRINT" and "PRINT SETTINGS" can be displayed. When the "PRINT" is selected, printing for the print job is performed. When the "PRINT SETTINGS" is selected, print settings can be changed.

The job history window 904 is a display area for displaying a history of the print jobs for which processing has been completed. The job history window 904 in this case displays a print job named "QUOTATION.pdf" as a job history of the print job for which printing has been completed. For the print job displayed in the job history window 904, print settings cannot be changed and printing cannot be performed, unlike for the print job displayed in the active window 903.

Figure 10:
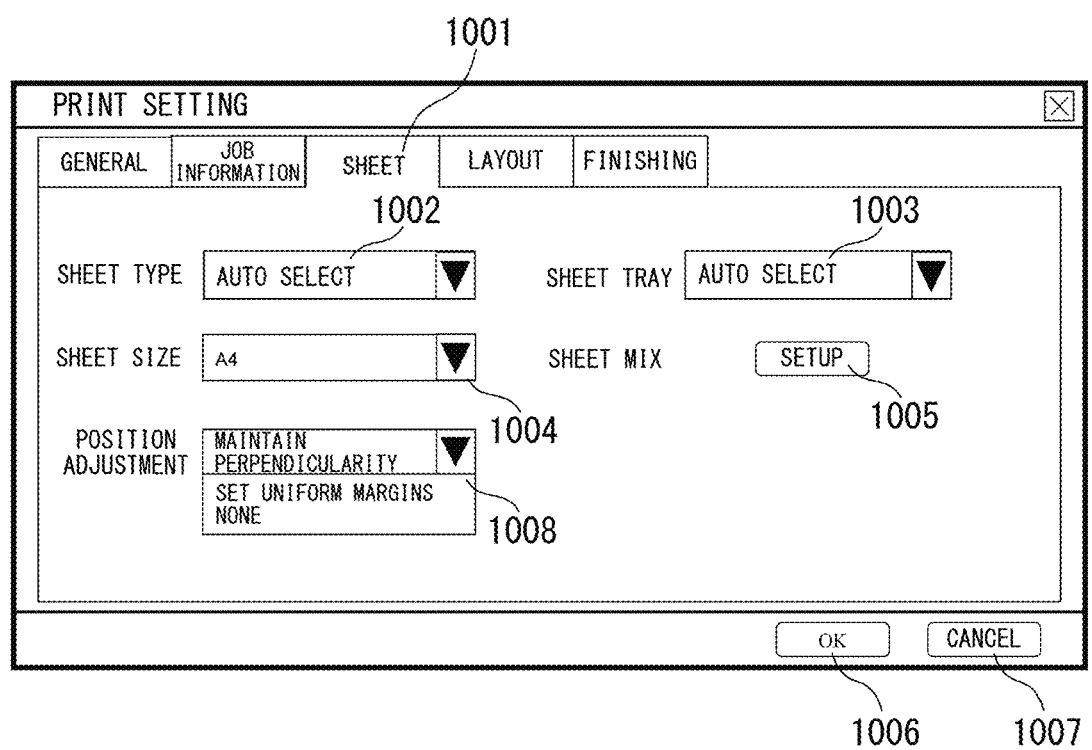
FIG. 10 is a diagram for illustrating an example of a print setting screen.

FIG. 10 is a diagram for illustrating an example of a print setting screen to be displayed on the display device 702 of the information processing apparatus 102 when the "PRINT SETTINGS" for the job is selected in the active window 903. The print setting screen includes tags 1001, an "OK" button 1006, and a "CANCEL" button 1007. The information processing apparatus 102 generates the job setting information based on details of settings made to the print setting screen.

The tags 1001 include five types of tags, which are a "GENERAL" tag, a "JOB INFORMATION" tag, a "SHEET" tag, a "LAYOUT" tag, and a "FINISHING" tag. Setting items in accordance with the type of the selected tag 1001 are displayed. The setting items for the "SHEET" tag are displayed in this case. The "SHEET" tag displays the setting items for making settings relating to a sheet on which an image is to be printed. For example, the "SHEET" tag allows the type of sheet to be used for the print job, the size thereof, a tray (feeding source), and a print position adjustment method to be selected.

A "SHEET TYPE" menu 1002 is a pull-down menu for setting the type of sheet to be used for the print job. For example, the "SHEET TYPE" menu 1002 allows "AUTO SELECT" or "PLAIN SHEET" to be set. A "SHEET TRAY" menu 1003 is a pull-down menu for setting a feeding source of the sheet to be used for the print job. For example, the "SHEET TRAY" menu 1003 allows "AUTO SELECT", "CASSETTE 1", or "MANUAL FEEDING" to be set. The print job allows an image to be formed on the sheet fed from the feeding source set in the "SHEET TRAY" menu 1003. A "SHEET SIZE" menu 1004 is a pull-down menu for setting the size of the sheet to be used for the print job. For example, the "SHEET SIZE" menu 1004 allows "A3", "A4", "B4", "B5", or "LTR" to be set. A "SHEET MIX" button 1005 is pressed when, for one print job, images are to be formed on a plurality of types of sheets having different sheet sizes and contained in different sheet trays.

A "POSITION ADJUSTMENT" menu 1008 is a pull-down menu for selecting a print position adjustment method. The printer 202 can adjust a print position on a sheet by a plurality of print position adjustment methods. In at least one embodiment, the printer 202 can adjust the print position by a print position adjustment method for adjusting the print position so as to maintain perpendicularity and by a print position adjustment method for adjusting the print position so as to set uniform margins. In the following description, the adjustment method for adjusting the print position so as to maintain perpendicularity is referred to as "first adjustment process", in which a predetermined image formation area in which the printer 202 can form an image is adjusted to a first area having a rectangular shape. Meanwhile, in the following description, the adjustment method for adjusting the print position so as to set uniform margins is referred to as "second adjustment process", in which the predetermined image formation area in which the printer 202 can form an image is adjusted to a second area having a shape similar to a shape of the sheet. In the "POSITION ADJUSTMENT" menu 1008, in addition to those print position adjustment methods, a "NO ADJUSTMENT" process, in which no print position adjustment is performed, can be set.

The "OK" button 1006 is a button for allowing the details of the setting made to the print setting screen to be reflected on printing. The "CANCEL" button 1007 is a button for canceling the details of the setting made to the print setting screen. Through the pressing of the "OK" button 1006 or the "CANCEL" button 1007, the print setting screen is closed.

Print Position Adjustment

By the print position adjustment, each of a print position of an image to be formed on a first surface of the sheet and a print position of an image to be formed on a second surface of the sheet is adjusted to an ideal print position. This adjustment allows correction of misalignment between the print position of the image to be formed on the first surface of the sheet and the print position of the image to be formed on the second surface of the sheet.

FIG. 11 is a diagram for illustrating an example of an interface screen for performing an operation, for example editing, on a sheet library. The sheet library is a database for managing sheets that can be used for printing in the image forming apparatus 101. The sheet library is stored in the storage 615 of the image forming apparatus 101 to be subjected to, for example, reading or updating as required. Details of the sheet library are described later.

An interface screen 1100 for performing an operation on the sheet library is displayed on the operation panel 323 of the printer 202. The interface screen 1100 includes a sheet list 1101, an "ADD NEW SHEET" button 1111, an "EDIT" button 1112, a "DELETE" button 1113, and an "ADJUST PRINT POSITION" button 1114.

The sheet list 1101 displays a list of sheets managed in the sheet library. The sheet list 1101 has, depending on types of individual sheets, such sheet attributes as shown in columns 1102 to 1107. The column 1102 shows names of the sheets. The names of the sheets are displayed so as to be distinguishable from each other. The columns 1103 and 1104 show sizes of the sheets. The column 1103 shows widths of the sheets, while the column 1104 shows lengths of the sheets. The column 1105 shows basis weights of the sheets. The column 1106 shows surface properties of the sheets. The surface properties represent physical properties of surfaces of the sheets. Examples of the surface properties include "COATED" indicating that coating treatment has been performed on the surface of a sheet to increase glossiness thereof and "EMBOSSED" indicating that depressions and projections have been formed on the surface of a sheet. The column 1107 shows colors of the sheets.

A touch operation performed on the operation panel 323 or the like allows a sheet to be selected in the sheet list 1101. The sheet attributes of the selected sheet are displayed to be highlighted to clearly show the selected sheet. In FIG. 11, a case in which "XYZ PAPER COLOR 81" is selected is illustrated by way of example. When the number of sheets managed in the sheet library is larger than the number of sheets that can be displayed simultaneously in the sheet list 1101, an operation performed on a scroll bar 1108 allows the sheet attributes to be displayed and selected.

The "ADD NEW SHEET" button 1111 is a button for allowing a new sheet to be added to the sheet library. The "EDIT" button 1112 is a button for allowing the sheet attributes of the sheet selected in the sheet list 1101 to be edited. The "DELETE" button 1113 is a button for allowing the sheet selected in the sheet list 1101 to be deleted from the sheet library. The "ADJUST PRINT POSITION" button 1114 is a button for allowing print position adjustment to be performed on the sheet selected in the sheet list 1101.

FIG. 12 is an explanatory diagram of the sheet library. The sheet library is stored in a file format such as an extensible markup language (XML) or comma-separated values (CSV) in the storage 615 of the image forming apparatus 101. The sheet library includes the sheet attributes of each sheet type and print position misalignment amounts thereof.

Rows 1201 to 1205 show respective sheet attributes of individual sheets registered in the sheet library. Columns 1211 to 1221 show individual items of the sheet attributes.

Each of the items is input to the interface screen through the operation panel 323. The column 1211 shows names of the sheets. The columns 1212 to 1215 show physical properties of the sheets. The column 1212 shows widths of the sheets. The column 1213 shows lengths of the sheets. The column 1214 shows basis weights of the sheets. The column 1215 shows surface properties of the sheets. The column 1216 shows colors of the sheets. The column 1217 shows the number (n) of sheets required to calculate the print position misalignment amounts. On each of the n sheets, adjustment charts described later are formed and, based on the result of measuring the adjustment charts, the print position misalignment amounts are determined.

The columns 1218 and 1219 show the respective print position misalignment amounts on front surfaces and back surfaces of the sheets at the time when adjustment is performed through use of the scanner 302. The columns 1220 and 1221 show the respective print position misalignment amounts on the front surfaces and the back surfaces of the sheets at the time when adjustment is performed through use of the reading device 204. Each of the print position misalignment amounts shows an amount of position misalignment from an ideal print position. In at least one embodiment, each of the print position misalignment amounts is represented by a perpendicularity correction amount, a keystone (trapezoidal) correction amount, a skew feeding correction amount, a lead position, a side position, a main scanning magnification, and a sub-scanning magnification. When adjustment is performed through use of the reading device 204, the perpendicularity correction amount is not included in the print position misalignment amounts. Each of the print position misalignment amounts corresponds to an adjustment amount for allowing the image position with respect to each of the sheets to be adjusted to an ideal print position. The print position misalignment amount also corresponds to an adjustment amount for adjusting the image formation area in which the printer 202 can form an image. During actual printing, the image forming apparatus 101 performs print position adjustment based on the print position misalignment amount such that each image is formed at the ideal print position. In other words, the image forming apparatus 101 performs adjustment so as to cancel out the print position misalignment amount and forms an image. For example, the image processor 605 performs affine transformation on the image data based on the print position misalignment amounts, to thereby correct the print position of each of the images to be formed on the sheet to the ideal print position. This correction also adjusts the predetermined image formation area, to thereby correct the size of the image, the rotation of the image, and the distortion of the image.

The perpendicularity correction amount represents an amount of misalignment between respective perpendicularities of print orientations in a sub-scanning direction and a main scanning direction with respect to the sheet. The "main scanning direction" as used herein refers to a direction in which a laser beam from the exposing device 303 scans a surface of the photosensitive drum 304, while the "sub-scanning direction" refers to a direction orthogonal to the main scanning direction. The sub-scanning direction corresponds to a direction (direction of sheet conveyance) in which each of the sheets is conveyed in the printer 202. For example, the perpendicularity correction amount is represented by an amount of misalignment between an ideal perpendicular line calculated with respect to a straight line printed in the sub-scanning direction and a straight line printed in the main scanning direction. The keystone correction amount represents an amount of misalignment between elongation and contraction of the sheet. For example, the keystone correction amount is represented by an amount of misalignment between a straight line printed, in the sub-scanning direction, from a position on a sheet at which printing is started to a rear end of sub-scanning and a straight line printed, in the sub-scanning direction, from a position on the sheet corresponding to a rear end of main scanning performed on the sheet to the rear end of the sub-scanning. The lead position and the side position represent respective print position misalignment amounts with respect to the sheet in the sub-scanning direction and the main scanning direction. The lead position is adjusted by changing a position at which the printing of the image is started, which begins at a leading end portion of the sheet in the direction of conveyance thereof. The side position is adjusted by changing a position at which printing of an image is started, which begins at a left end portion of the sheet in the direction of conveyance thereof. Specifically, the lead position and the side position are adjusted by adjusting a time when emission of the laser beam toward the photosensitive drum 304 is started. The sub-scanning magnification represents image length misalignment (magnification with respect to an ideal length) in the sub-scanning direction. The sub-scanning magnification is adjusted by controlling a rotation speed of the transfer drum 305. The main scanning magnification represents image length misalignment (magnification with respect to an ideal length) in the main scanning direction.

The print position misalignment amount is determined by printing the adjustment charts (position measurement images) on which predetermined marks are disposed on a sheet and detecting the positions of the marks on the adjustment charts. An initial value of each of the items of the print position misalignment amounts is "0". When a new sheet is registered in the sheet library or when the print position has not been adjusted even though the sheet has been registered in the sheet library, the initial value is used as the print position misalignment amount.

Figure 14:
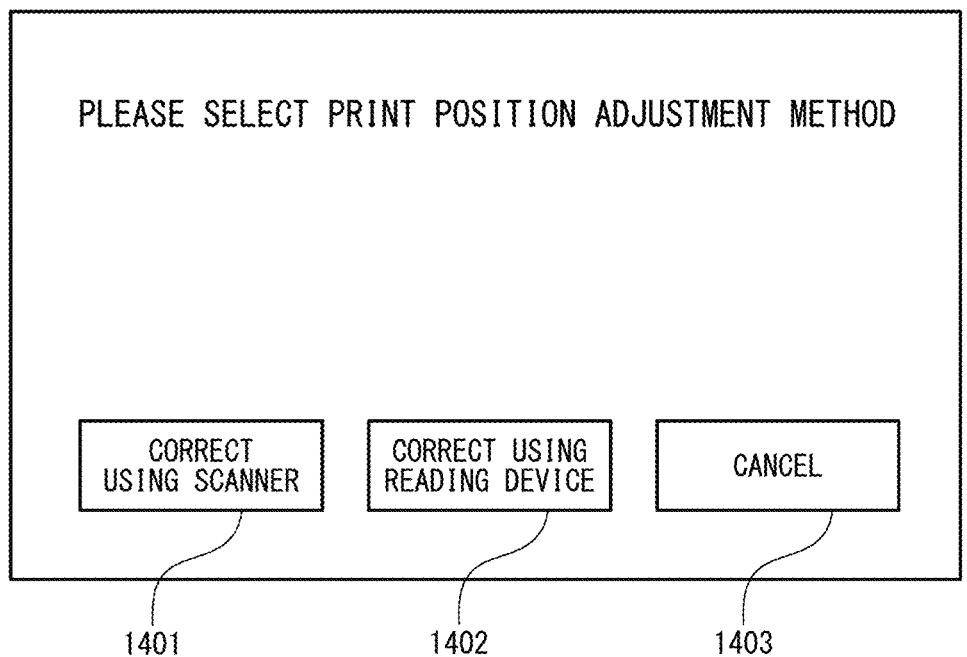
FIG. 14 is a diagram for illustrating an example of an instruction screen for giving an instruction to implement a print position adjustment method.

FIG. 13 is an explanatory diagram of the adjustment chart. After the print position adjustment is started, the adjustment chart is printed on a sheet based on an instruction from the CPU 607. On each of a front surface 1300 and a back surface 1301 of the sheet, the same adjustment chart is printed. FIG. 14 is a diagram for illustrating an example of an instruction screen for giving an instruction to specify a print position adjustment method. A user inputs an instruction to such an instruction screen as displayed on the operation panel 323. In response to the instruction given to the instruction screen, the CPU 607 obtains user instruction information and gives an instruction to print the adjustment chart. When any of a "CORRECT USING SCANNER" button 1401 or a "CORRECT USING READING DEVICE" button 1402 is pressed, the adjustment chart is printed. When a "CANCEL" button 1403 is pressed, a print position adjustment process is canceled.

An image 1310 is an arrow and characters to be printed on the front surface 1300. The image 1310 is used to identify the direction of conveyance of the sheet on which the adjustment charts are printed and the front and back surfaces thereof. An image 1311 is an arrow and characters to be printed on the back surface 1301. The image 1311 is used to identify the direction of conveyance of the sheet on which the adjustment charts are printed and the front and back surfaces thereof. When the scanner 302 is caused to read the adjustment charts, the images 1310 and 1311 are printed so as to prevent an operator from making a mistake in identifying an orientation. The images 1310 and 1311, which are not directly related to the determination of the print position misalignment amounts, are not necessarily required to be printed.

Marks 1320 are images printed at specific positions on the adjustment charts. The marks 1320 are formed through use of a toner in a color having a large reflectance difference with the sheet. In at least one embodiment, the marks 1320 are formed with a black toner. In at least one embodiment, the marks 1320 are formed at the total of eight positions on the respective four corners of the front surface 1300 and the back surface 1301 of the sheet. When the print positions are ideal, the marks 1320 are formed at positions each at a predetermined distance from an end portion of the sheet. Relative positions of the marks 1320 on the adjustment charts are measured to allow the print position misalignment amounts to be determined. A distance of each of the marks 1320 from a reference side of the sheet is measured to allow a shape of the image formation area, the size of the image formation area, and a positional relationship between the reference side of the sheet and the image formation area to be sensed.

In at least one embodiment, when the print position adjustment is performed through use of the reading device 204, distances C to R are measured while, when the print position adjustment is performed through use of the scanner 302, distances A to V are measured. The distances A to V of FIG. 13 are measured. The distance A is a length of the adjustment chart in the sub-scanning direction. The distance B is a length of the adjustment chart in the main scanning direction. Ideal lengths of the distances A and B are sheet lengths set in the sheet library. The distances C to V are lengths between the respective marks 1320 and respective end portions of the sheet that are closest to the marks 1320.

The front surface 1300 is divided by a chart middle line 1340 into two areas 1351 and 1352. The back surface 1301 is divided by a chart middle line 1341 into two areas 1353 and 1354. Of the adjustment chart, the front surface 1300 and the back surface 1301 are divided into the regions 1351, 1352, 1353, and 1354, which are individually read by the scanner 302. Triangular marks 1331 to 1334 indicate the order in which the areas 1351, 1352, 1353, and 1354 are read and serve as guide marks indicating a position on the scanner 302 at which the sheet is placed. The operator causes the scanner 302 to read the adjustment charts in the order corresponding to the numbers of the triangular marks. The adjustment charts in this case are read in the order of the area 1352, the area 1351, the area 1354, and the area 1353. After the adjustment charts divided into the individual areas 1351 to 1354 are read, reading results are combined with each other. By thus reading the adjustment charts divided into the individual areas, the scanner 302 can read the adjustment charts even when the size of each of the adjustment charts is too large to be placed on the original table 300.

A process of determining the print position misalignment amounts based on the measured distances A to V is now described. FIG. 15 is an explanatory diagram of the process of determining the print position misalignment amounts.

Each of the print position misalignment amounts is represented by items for the front surface and items for the back surface. The items for the front surface include a lead position 1501, a side position 1502, a main scanning magnification 1503, a sub-scanning magnification 1504, a perpendicularity correction amount 1505, and a keystone correction amount 1506. The items for the back surface include a lead position 1507, a side position 1508, a main scanning magnification 1509, a sub-scanning magnification 1510, a perpendicularity correction amount 1511, and a keystone correction amount 1512. For each of the items common to the front surface and the back surface, a measurement value 1520 and a print position misalignment amount 1522 are calculated based on the same calculation formula, and a common ideal value 1521 is set.

The respective measurement values 1520 of the individual items are calculated from the respective actually measured values of the distances A to V described with reference to FIG. 13 through use of respective calculation formulae set for the individual items on a one-by-one basis. The respective measurement values 1520 of the lead positions 1501 and 1507 correspond to respective average values of the distances C and E (K and M) from the leading end portions of the sheet in the direction of conveyance thereof to the corresponding marks 1320. The respective measurement values 1520 of the side positions 1502 and 1508 correspond to respective average values of the distances F and J (N and R) from the left end portions of the sheet in the direction of conveyance thereof to the corresponding marks 1320. The respective measurement values 1520 of the main scanning magnitudes 1503 and 1509 correspond to the respective average values of the distances between the marks 1320 aligned on the same line in the main scanning direction. The respective measurement values 1520 of the sub-scanning magnitudes 1504 and 1510 correspond to the respective average values of the distances between the marks 1320 aligned on the same line in the sub-scanning direction. The respective measurement values 1520 of the perpendicularity correction amounts 1505 and 1511 correspond to respective average values of misalignment amounts S and T (U and V) in the sub-scanning direction between the marks 1320 on a reading rear end side and lines perpendicular to straight lines connecting the marks 1320 on a reading lead end side, which are aligned on the same scanning lines in the main scanning direction. The respective measurement values 1520 of the keystone correction amounts 1506 and 1512 correspond to the differences between the distances between the marks 1320 aligned on the same scanning lines in the sub-scanning direction.

The respective ideal values 1521 of the individual items are obtained based on the marks 1320 formed at positions each spaced apart by 1 cm from an end portion of the sheet. The ideal value 1521 of each of the lead positions 1501 and 1507 and the side positions 1502 and 1508 is 1 cm. The ideal value 1521 of each of the main scanning magnifications 1503 and 1509 is obtained by subtracting 2 cm from the length of the sheet registered in the sheet library. The ideal value 1521 of each of the sub-scanning magnifications 1504 and 1510 is obtained by subtracting 2 cm from the width of the sheet registered in the sheet library. The ideal value 1521 of each of the perpendicularity correction amounts 1505 and 1511 and the keystone correction amounts 1506 and 1512 is 0 cm.

The respective print position misalignment amounts 1522 of the individual items are calculated from the corresponding measurement values 1520 and the corresponding ideal values 1521 through use of respective calculation formulae set on a one-by-one basis for the individual items. The respective print position misalignment amounts 1522 of the lead positions 1501 and 1507, and the side positions 1502 and 1508 are calculated by subtracting the ideal values 1521 from the measurement values 1520 (in units of millimeter). The respective print position misalignment amounts 1522 of the main scanning magnifications 1503 and 1509 and the sub-scanning magnifications 1504 and 1510 are calculated by dividing values obtained by subtracting the ideal values 1521 from the measurement values 1520 by the ideal values (in units of percent). As the respective print position misalignment amounts 1522 of the perpendicularity correction amounts 1505 and 1511 and the keystone correction amounts 1506 and 1512, the measurement values 1520 are used without alteration. The respective calculated print position misalignment amounts 1522 of the individual items are managed in the columns 1218 to 1221 of the sheet library illustrated in FIG. 12.

When the scanner 302 is used, the distances A to V can be measured through use of the adjustment charts read by the scanner 302. Accordingly, the respective print position misalignment amounts 1522 of all the items can be calculated. When the reading device 204 is used, the distances C to R can be measured through use of the adjustment charts read by the reading device 204. Accordingly, the respective print position misalignment amounts 1522 of the items other than the perpendicularity correction amounts 1505 and 1511 can be calculated. The reading device 204 reads the adjustment charts, while allowing the sheet to be conveyed. It may be possible that, due to a non-uniform speed of conveyance of the sheet or the like, the reading device 204 does not have a sufficient accuracy required for the print position adjustment. Consequently, the number of items of distances that can be read by the reading device 204 is smaller than the number of items of distances that can be read by the scanner 302.

Figure 16A:
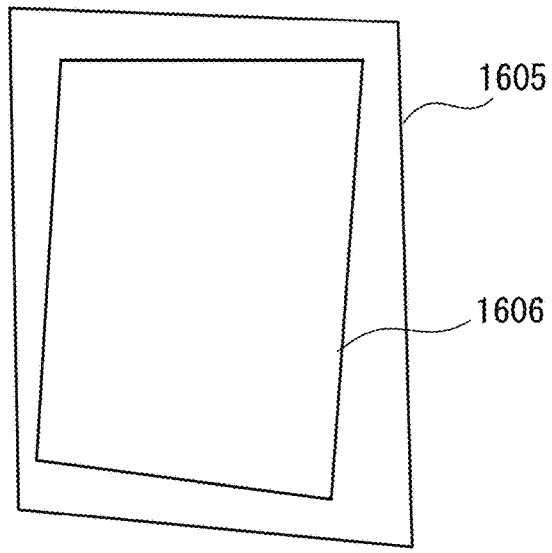
FIG. 16A is an explanatory diagram of an image after print position adjustment.
Figure 16B:
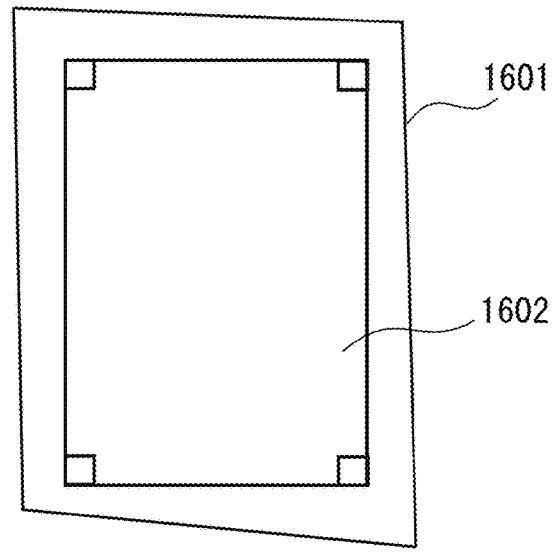
FIG. 16B is an explanatory diagram of the image after the print position adjustment.
Figure 16C:
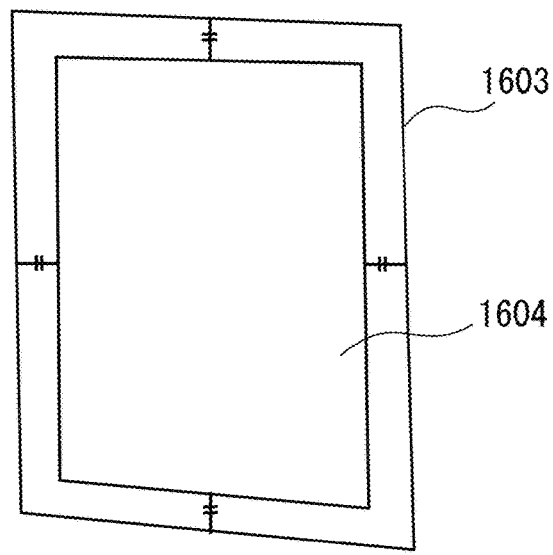
FIG. 16C is an explanatory diagram of the image after the print position adjustment.

FIG. 16A, FIG. 16B, and FIG. 16C are explanatory diagrams of the print position adjustment process. In FIG. 16A, FIG. 16B, and FIG. 16C, image formation areas 1602, 1604, and 1606 on respective sheets 1601, 1603, and 1605 are illustrated. Due to elongation and contraction of the sheets 1601, 1603, and 1605, each of the sheets 1601, 1603, and 1605 no longer has a rectangular shape. Each of the image formation areas 1602, 1604, and 1606 is an area in which an image can be formed. In FIG. 16A, the image formation area 1606 obtained when the print position adjustment is not performed is illustrated. When the print position adjustment is not performed, perpendicularity of the image formation area 1606 is not maintained. In addition, the respective distances (margins) between the four sides of the image formation area 1606 and edges of the sheet 1605 are non-uniform. In FIG. 16B, an image obtained when the first adjustment process is performed is illustrated. In the first adjustment process, the print position misalignment amounts 1522 of the perpendicularity correction amounts 1505 and 1511 are also used. In FIG. 16C, an image obtained when the second adjustment process is performed is illustrated. In the second adjustment process, the print position misalignment amounts 1522 of the perpendicularity correction amounts 1505 and 1511 are not used. In each of FIG. 16A, FIG. 16B, and FIG. 16C, respective distortions of the sheets resulting from heat from the fixing device 308 are represented in an exaggerated manner to allow a difference between the individual processes to be easily recognized.

As illustrated in FIG. 16B, when the respective print position misalignment amounts 1522 of the perpendicularity correction amounts 1505 and 1511 are included in the items of the print position adjustment, respective print positions on the front and back surfaces are adjusted so as to allow the perpendicularity of the image formation area 1602 to be maintained. However, distances (margin widths) between four sides of the image formation area 1602 and edges of the sheet 1601 are non-uniform. The image formation area 1602 has a rectangular shape of ideal dimensions. This corresponds to a case in which the print position adjustment is performed based on the result of reading the adjustment chart placed on the original table 300 through use of the scanner 302.

As illustrated in FIG. 16C, when the respective print position misalignment amounts 1522 of the perpendicularity correction amounts 1505 and 1511 are not included in the items of the print position adjustment, respective print positions on the front and back surfaces are adjusted so as to allow uniformity of the margins to be maintained. In other words, the distances (margin widths) between four sides of the image formation area 1604 and edges of the sheet 1603 have a predetermined value and are uniform, but the perpendicularity of the image formation area 1604 is not maintained. The image formation area 1604 has a shape similar to that of the sheet 1603, on which the test images are formed. This corresponds to a case in which the print position adjustment is performed through use of the reading device 204.

When the distances are calculated from the adjustment charts through use of the reading device 204, the reading device 204 first scans the sheet passing through respective reading positions of the line sensors 503 to read the adjustment charts. Data read from the adjustment charts is transmitted to the CPU 607. The CPU 607 detects, based on a density difference in the adjustment charts, end portions of the sheet and edges (boundaries between a sheet base and the marks 1320) of the marks 1320. The CPU 607 calculates the distances C to R from the detected end portions of the sheet and the detected edges of the marks 1320.

When the distances are calculated from the adjustment chart through use of the scanner 302, the scanner 302 reads each of the front and back surfaces of the adjustment chart placed on the original table 300 in two steps. The reading is performed in the order of the triangular marks 1331 to 1334 in response to the instruction given by the operator. The results (read data) of reading the adjustment chart are transmitted to the CPU 607. The CPU 607 combines the result of reading the area 1351 and the result of reading the area 1352 with each other to produce a front-surface adjustment chart. The CPU 607 combines the result of reading the area 1353 and the result of reading the area 1354 with each other to produce a back-surface adjustment chart. The CPU 607 detects, from the density difference between the adjustment charts based on the results of the combinations, the end portions of the sheet and the edges of the marks 1320. The CPU 607 calculates the distances A to V from the detected end portions of the sheet and the detected edges of the marks 1320.

Figure 17:
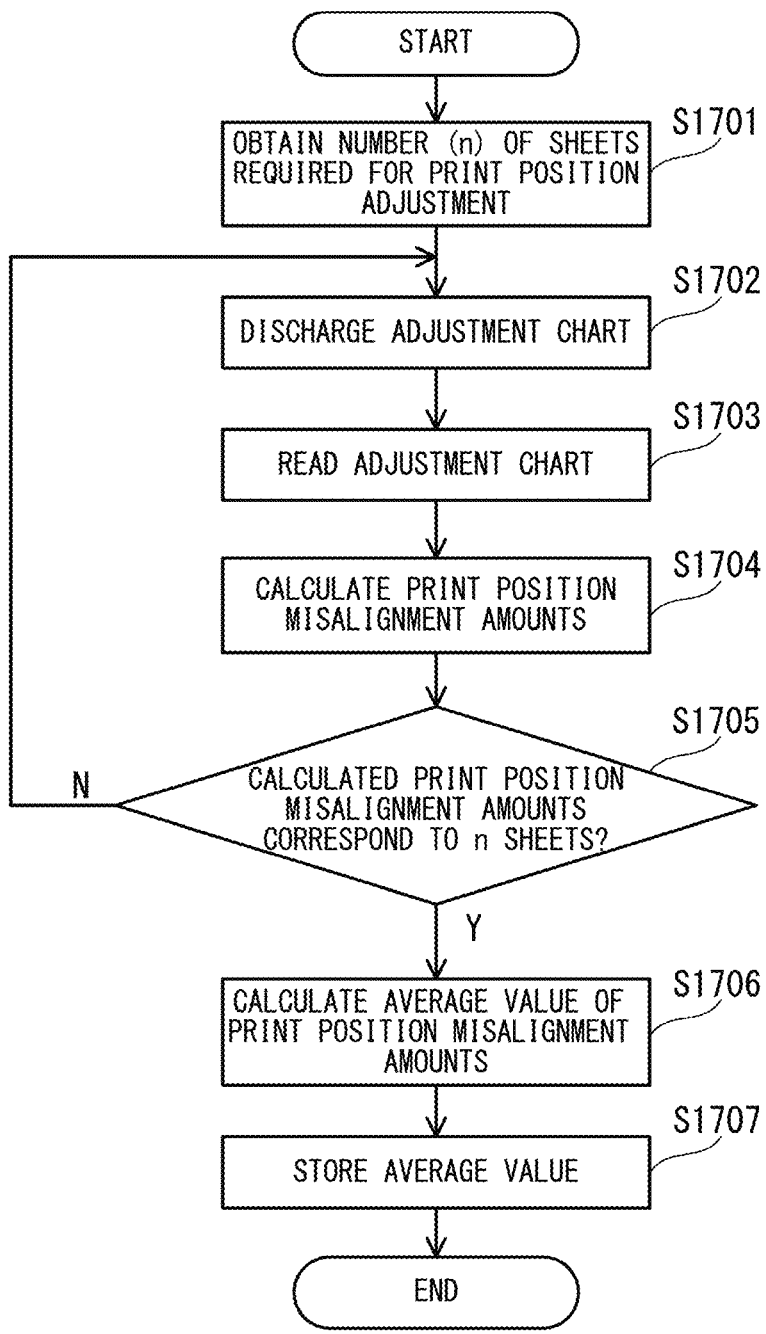
FIG. 17 is a flow chart for illustrating a process of calculating print position misalignment amounts.

FIG. 17 is a flow chart for illustrating a process of calculating the print position misalignment amounts. In at least one embodiment, the operator selects one of the sheets in the interface screen of FIG. 11 displayed on the operation panel 323 and presses the "ADJUST PRINT POSITION" button 1114 to cause the instruction screen of FIG. 14 to be displayed on the operation panel 323. The operator selects a print position adjustment method from among the print position adjustment methods in the instruction screen to cause the operation panel controller 611 to receive user instruction information. As a result, the CPU 607 starts the process of calculating the print position misalignment amounts. The print position misalignment amounts are calculated in this case through use of the reading device 204. Accordingly, the "CORRECT USING READING DEVICE" button 1402 is selected, and the process of calculating the print position misalignment amounts is started. The process of calculating the print position misalignment amounts may also be automatically started by a specific trigger.

The CPU 607 obtains, from the sheet library, the number (n) of sheets required to calculate the print position misalignment amounts of the sheet selected by the operator (Step S1701). When the print position adjustment process is input, the CPU 607 automatically obtains, from the sheet library, the number of the sheets on which the adjustment charts are to be printed when the print position adjustment is performed on the sheet. The CPU 607 may also perform display control for the operation panel 323 so as to cause, every time the print position adjustment process is input, the operator to input the number of the sheets on which the adjustment charts are to be printed.

The printer 202 prints, on both surfaces of each of the sheets selected by the operator, the adjustment charts illustrated by way of example in FIG. 13 and having the marks 1320 disposed therein, and outputs the sheet to the outside of the image forming apparatus (Step S1702). The output sheet is conveyed to the reading device 204. The CPU 607 causes the reading device 204 to scan images on both surfaces of the sheet having the adjustment charts printed thereon. The reading device 204 causes the two line sensors 503 to simultaneously read the adjustment charts from both surfaces of the sheet. The CPU 607 obtains, from the reading device 204, the data read from the adjustment charts (Step S1703).

The CPU 607 extracts, based on the data read from the adjustment charts, respective positions of the end portions of the sheet and the marks 1320, and obtains the distances C to R illustrated in FIG. 13. The CPU 607 calculates, through use of the obtained distances C to R, the print position misalignment amounts based on the calculation formulae of FIG. 15 (Step S1704). The CPU 607 stores, in the storage 615, the calculated print position misalignment amounts.

The CPU 607 determines whether or not the calculation of the misalignment amounts is performed for each of the sheets, the number (n) of which is obtained in the process of Step S1701 (Step S1705). When the calculation of the misalignment amounts is not performed for each of the n sheets ("N" in Step S1705), the CPU 607 repeatedly performs the process of Steps S1702 to S1704 until the calculation of the misalignment amounts corresponding to each of the n sheets is performed.

When the calculation of the misalignment amounts corresponding to each of the n sheets is performed ("Y" in Step S1705), the CPU 607 calculates an average value of the misalignment amounts stored in the storage 615 (Step S1706). The CPU 607 stores, in the sheet library, the calculated average value as the print position misalignment amounts of the sheets selected in the interface screen of FIG. 11 (Step S1707). In the process of Step S1707, the CPU 607 updates information on the print position misalignment amounts in the sheet library, which is to be stored in the storage 615. Based on the print position misalignment amounts determined as described above, the CPU 607 adjusts respective positions (print positions) at which images are to be formed when images are formed on a sheet of a similar type.

When the print position misalignment amounts are calculated through use of the scanner 302, the "CORRECT USING SCANNER" button 1401 is selected, and a process of calculating the print position misalignment amounts is started. Due to the use of the scanner 302, the adjustment charts are not automatically read unlike when the reading device 204 is used, and consequently the operator performs a reading operation. The process is the same as that performed when the reading device 204 is used, but the CPU 607 obtains the distances A to V illustrated in FIG. 13 based on data read from the adjustment charts. The CPU 607 calculates, through use of the obtained distances A to V, the print position misalignment amounts based on the calculation formulae of FIG. 15. The CPU 607 stores the calculated print position misalignment amounts in the storage 615.

The print position misalignment amounts calculated in the process of FIG. 17 serve as correction amounts for adjusting the positions at which images are to be formed when the print position adjustment process is performed. The printer 202 uses, as conditions for adjusting the print positions, the print position misalignment amounts (correction amounts). The printer 202 performs the print position adjustment process based on the corresponding print position misalignment amounts in the sheet library. In the sheet library of FIG. 12, the columns 1218 to 1221 correspond to individual print position adjustment conditions. The printer 202 selects an appropriate condition from among the plurality of adjustment conditions and performs the print position adjustment process. In the following, four examples of an image formation process including the print position adjustment process are described.

Image Formation Process 1

Figure 18:
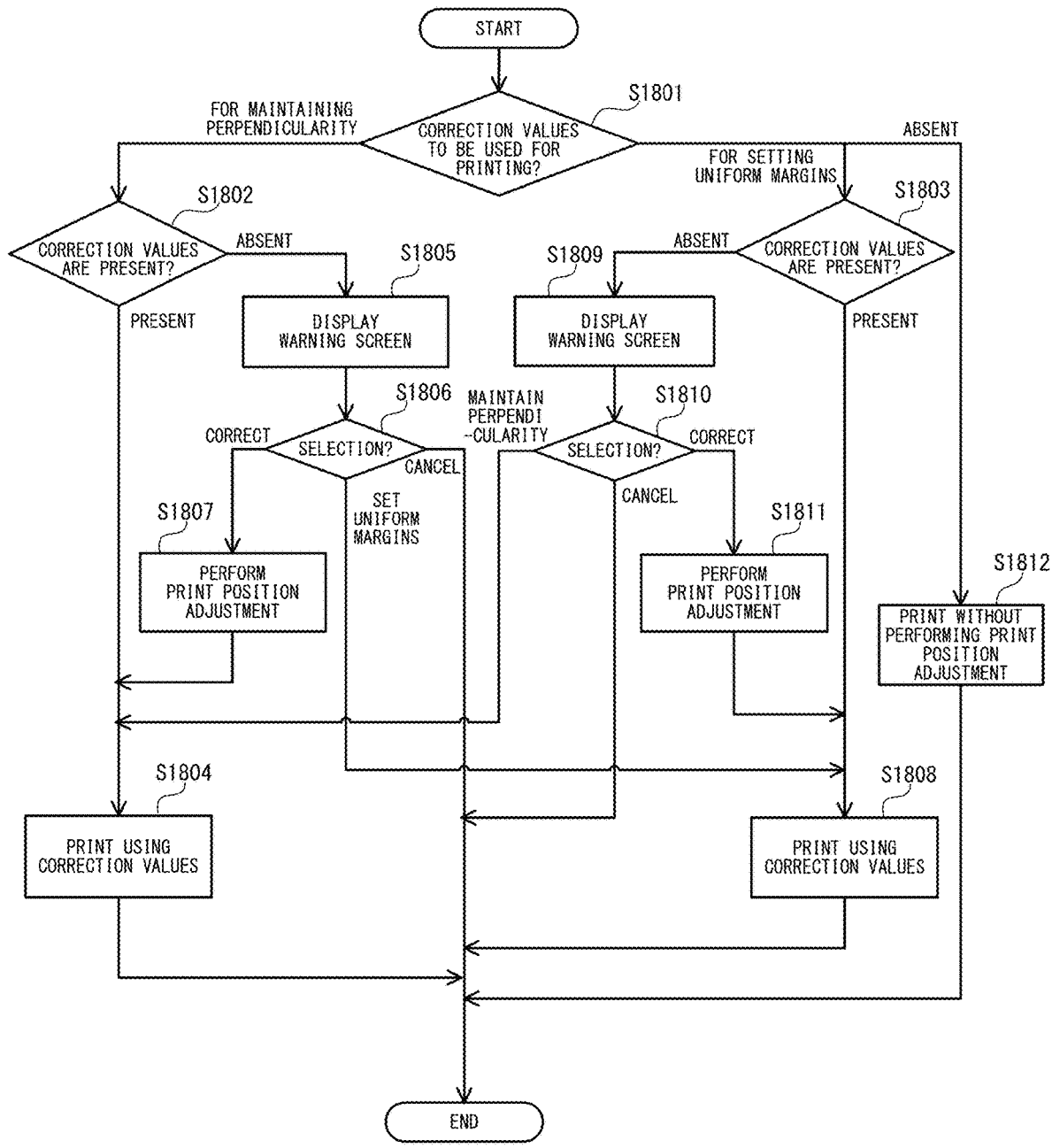
FIG. 18 is a flow chart of an image formation process including a print position adjustment process.

FIG. 18 is a flow chart for illustrating the image formation process including the print position adjustment process. The process is started when the operator makes print settings in the print setting screen of FIG. 10 and presses the "OK" button 1006. As a result, the information processing apparatus 102 transmits, to the image forming apparatus 101, an instruction to perform the image formation process including job setting information for a print job.

When receiving the instruction to perform the image formation process, the CPU 607 of the image forming apparatus 101 determines the print position adjustment method set in the "POSITION ADJUSTMENT" menu 1008 based on the job setting information (Step S1801). As described above, in the "POSITION ADJUSTMENT" menu 1008, any of the first adjustment process, the second adjustment process, and the "NO ADJUSTMENT" process, in which no print position adjustment is performed, can be selected. When the "NO ADJUSTMENT" process is selected ("ABSENT" in Step S1801), the CPU 607 performs normal printing without performing any of the print position adjustment processes (Step S1812).

When the first adjustment process is selected ("FOR MAINTAINING PERPENDICULARITY" in Step S1801), the CPU 707 determines the presence or absence of correction values for the first adjustment process (Step S1802). The CPU 607 refers to the sheet library of FIG. 12 to determine the presence or absence of the correction values for the first adjustment process based on whether or not the correction values for the first adjustment process corresponding to the type of sheet to be used for printing are set in the columns 1218 and 1219. When the correction values for the first adjustment process are set ("PRESENT" in Step S1802), the CPU 607 adjusts the print positions based on the correction values set in the columns 1218 and 1219 of the sheet library, and performs printing (Step S1804).

Figure 19:
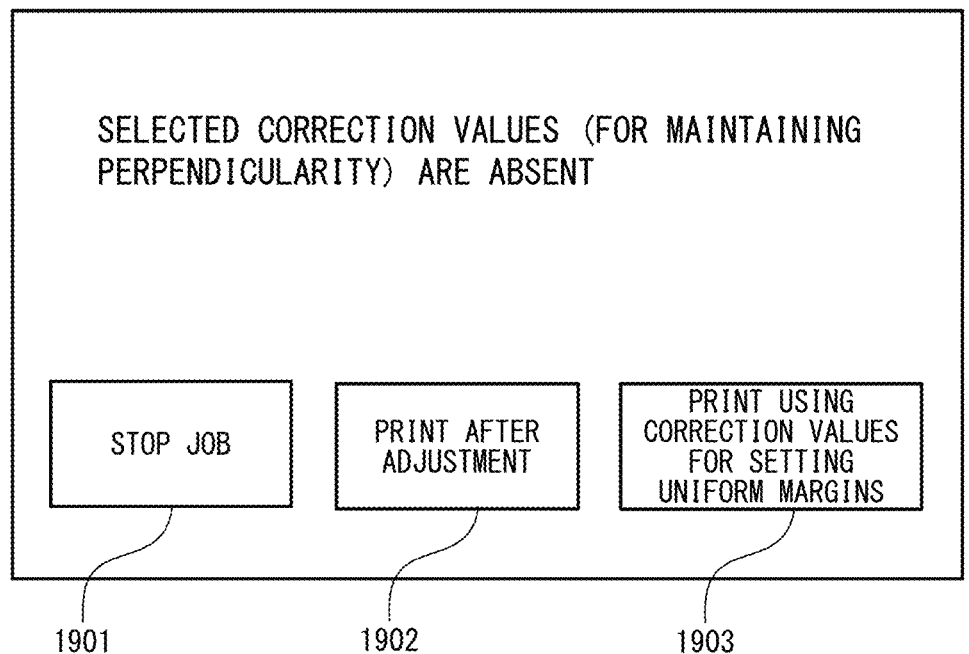
FIG. 19 is a diagram for illustrating an example of a warning screen.

When the correction values for the first adjustment process are not set ("ABSENT" in Step S1802), the CPU 607 displays, on the operation panel 323, a warning screen for notifying the user that the correction values for the first adjustment process are not registered (Step S1805). FIG. 19 is a diagram for illustrating an example of the warning screen. The warning screen displays a button 1901 for stopping a print job, a "PRINT AFTER ADJUSTMENT" button 1902 for allowing printing to be performed after the correction values for the first adjustment process are registered, and a button 1903 for allowing printing to be performed through use of the correction values for the second adjustment process. The "PRINT AFTER ADJUSTMENT" button 1902 is a button for giving an instruction to obtain the correction values for the first adjustment process through use of the scanner 302 and perform printing through use of the obtained correction values. The button 1903 is selectable when the correction values for the second adjustment process are present, but is displayed in grayout and is unselectable, for example, when the correction values for the second adjustment process are absent. The CPU 607 determines which button is selected by the operator in the warning screen (Step S1806). When the button 1901 is selected ("CANCEL" in Step S1806), the CPU 607 stops the print job and ends the process.

When the "PRINT AFTER ADJUSTMENT" button 1902 is selected ("CORRECT" in Step S1806), the CPU 607 performs the print position adjustment using the scanner 302 (Step S1807). The print position adjustment using the scanner 302 is the same as in the process performed when the "CORRECT USING SCANNER" button 1401 is selected in the instruction screen of FIG. 14 described above. After the print position adjustment, the CPU 607 adjusts the print positions based on the correction values set in the columns 1218 and 1219 of the sheet library, and performs printing (Step S1804).

When the button 1903 is selected ("SET UNIFORM MARGINS" in Step S1806), the CPU 607 adjusts the print positions based on the correction values set in the columns 1220 and 1221 of the sheet library, and performs printing (Step S1808).

When the second adjustment process is selected in the "POSITION ADJUSTMENT" menu 1008 ("SET UNIFORM MARGINS" in Step S1801), the CPU 607 determines the presence or absence of the correction values for the second adjustment process (Step S1803). The CPU 607 refers to the sheet library of FIG. 12 to determine the presence or absence of the correction values for the second adjustment process based on whether or not the correction values for the second adjustment process corresponding to the type of sheet to be used for printing are set in the columns 1220 and 1221. When the correction values for the second adjustment process are set ("PRESENT" in Step S1803), the CPU 607 adjusts the print positions based on the correction values set in the columns 1220 and 1221 of the sheet library, and performs printing (Step S1808).

When the correction values for the second adjustment process are not set ("ABSENT" in Step S1803), the CPU 607 displays, on the operation panel 323, a warning screen for notifying the user that the correction values for the second adjustment process are not registered (Step S1809). The warning screen is a screen after "MAINTAIN PERPENDICULARITY" of FIG. 19 is changed to "SET UNIFORM MARGINS" and the button 1903 of FIG. 19 is changed to "PRINT USING CORRECTION VALUES FOR FIRST ADJUSTMENT PROCESS". The CPU 607 determines which button is selected by the operator in the warning screen (Step S1810). When the button 1901 is selected ("CANCEL" in Step S1810), the CPU 607 stops the print job and ends the process.

When the "PRINT AFTER ADJUSTMENT" button 1902 is selected ("CORRECT" in Step S1810), the CPU 607 performs the print position adjustment using the reading device 204 (Step S1811). The print position adjustment using the reading device 204 is the same as in the process performed when the "CORRECT USING READING DEVICE" button 1402 is selected in the instruction screen of FIG. 14 described above. After the print position adjustment, the CPU 607 adjusts the print positions based on the correction values set in the columns 1220 and 1221 of the sheet library, and performs printing (Step S1808).

When the button 1903 is selected ("MAINTAIN PERPENDICULARITY" in Step S1810), the CPU 607 adjusts the print positions based on the correction values set in the columns 1218 and 1219 of the sheet library, and performs printing (Step S1804).

According to Image Formation Process 1, the image forming apparatus 101 performs the print position adjustment through use of the correction values specified by the operator from among the correction values for a plurality of print positions, and forms an image. This process allows print position adjustment appropriate for a printed material to be performed depending on post-treatment, for example cutting.

Image Formation Process 2

Figure 20:
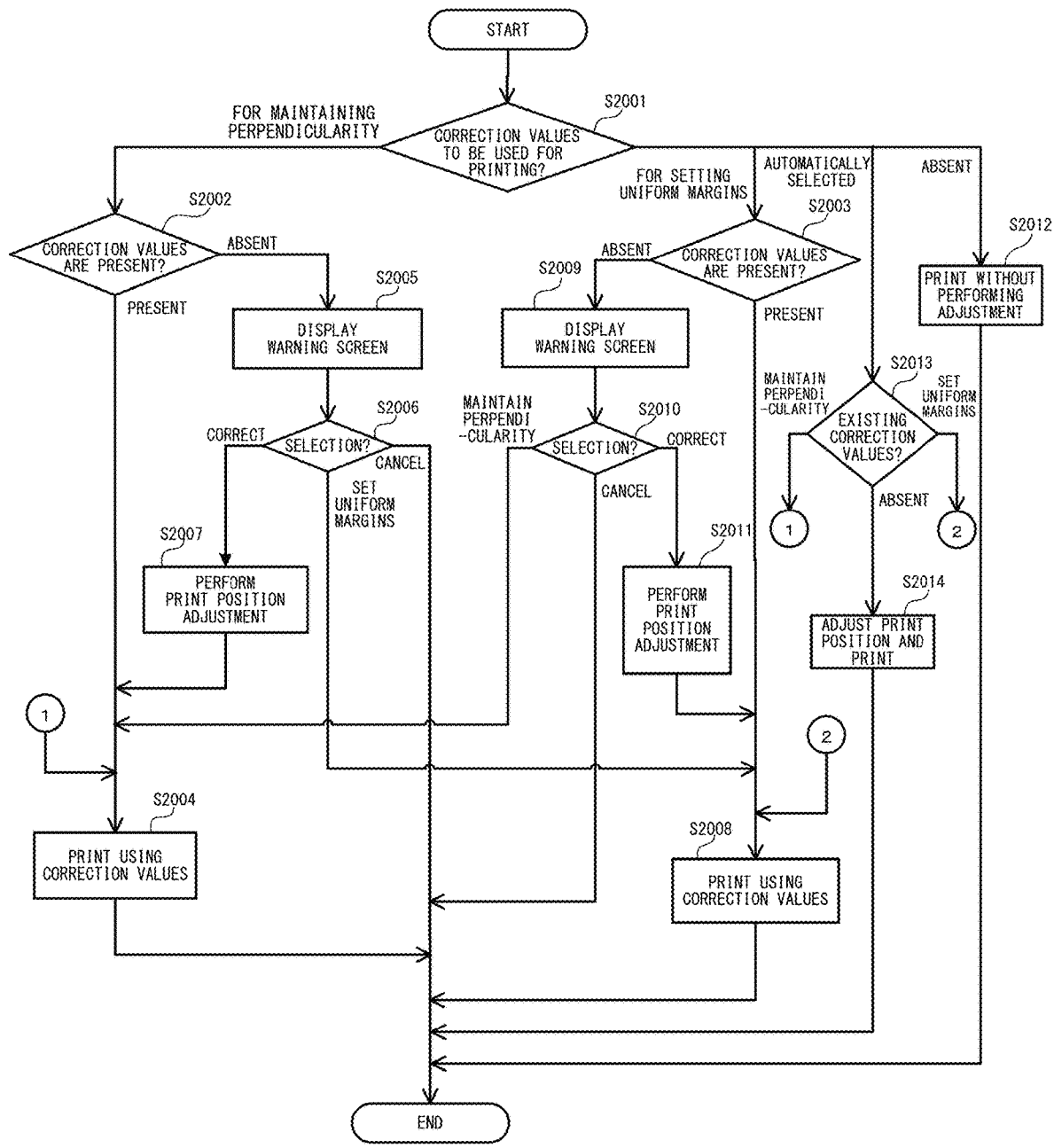
FIG. 20 is a flow chart for illustrating the image formation process including the print position adjustment process.

Displaying the warning screen may cause feeling of annoyance when it is only required to align the respective print positions on the front and back surfaces with each other. By allowing for automatic selection of the correction values for the print positions, it is possible to reduce an operation to be performed by the operator in response to the warning screen. The automatic selection of the correction values is performed when, for example, "AUTO SELECT" is added as an option to the "POSITION ADJUSTMENT" menu 1008 in the print setting screen of FIG. 10, and the operator selects "AUTO SELECT". FIG. 20 is a flow chart for illustrating the image formation process including the print position adjustment process to be performed in such a process. This process is also started when the operator makes print settings in the print setting screen of FIG. 10 and presses the "OK" button 1006.

When receiving an instruction to perform the image formation process, the CPU 607 of the image forming apparatus 101 determines the print position adjustment method set in the "POSITION ADJUSTMENT" menu 1008 based on the job setting information (Step S2001). The process (Steps S2002 to S2012) performed when any of the first adjustment process, the second adjustment process, and the "NO ADJUSTMENT" process is set is the same as the process (Steps S1802 to S1812) of FIG. 18. Therefore, a description of the process performed in such cases is omitted.

When "AUTO SELECT" is set as the print setting ("AUTOMATICALLY SELECTED" in Step S2001), the CPU 607 determines the presence or absence of the correction values for adjusting the print positions (Step S2013). The CPU 607 refers to the sheet library of FIG. 12 and determines, depending on the type of sheet to be used for printing, the presence or absence of the correction values for adjusting the print positions based on whether or not the correction values are set in the columns 1218 to 1221. When only the correction values for the first adjustment process are present ("FOR MAINTAINING PERPENDICULARITY" in Step S2013), the CPU 607 performs the process of Step S2004. When only the correction values for the second adjustment process are present ("FOR SETTING UNIFORM MARGINS" in Step S2013), the CPU 607 performs the process of Step S2008. When the correction values are absent ("ABSENT" in Step S2013), the CPU 607 performs the print position adjustment, and performs the image formation process (Step S2014). In this case, the CPU 607 causes the instruction screen illustrated by way of example in FIG. 14 to be displayed on the operation panel 323, and performs the print position adjustment based on the instruction given via the instruction screen. The CPU 607 adjusts the print positions based on the correction values determined by the print position adjustment and performs printing. When both of the correction values for the first adjustment process and the correction values for the second adjustment process are present, the CPU 607 uses, for example, the correction values for the adjustment process set in advance to perform printing.

According to Image Adjustment Process 2, the image forming apparatus 101 automatically determines the correction values to be used for the print position adjustment from among the correction values for the plurality of print positions, performs the print position adjustment, and forms an image. This process can relieve the operator from a troublesome operation.

Image Formation Process 3

Figure 21:
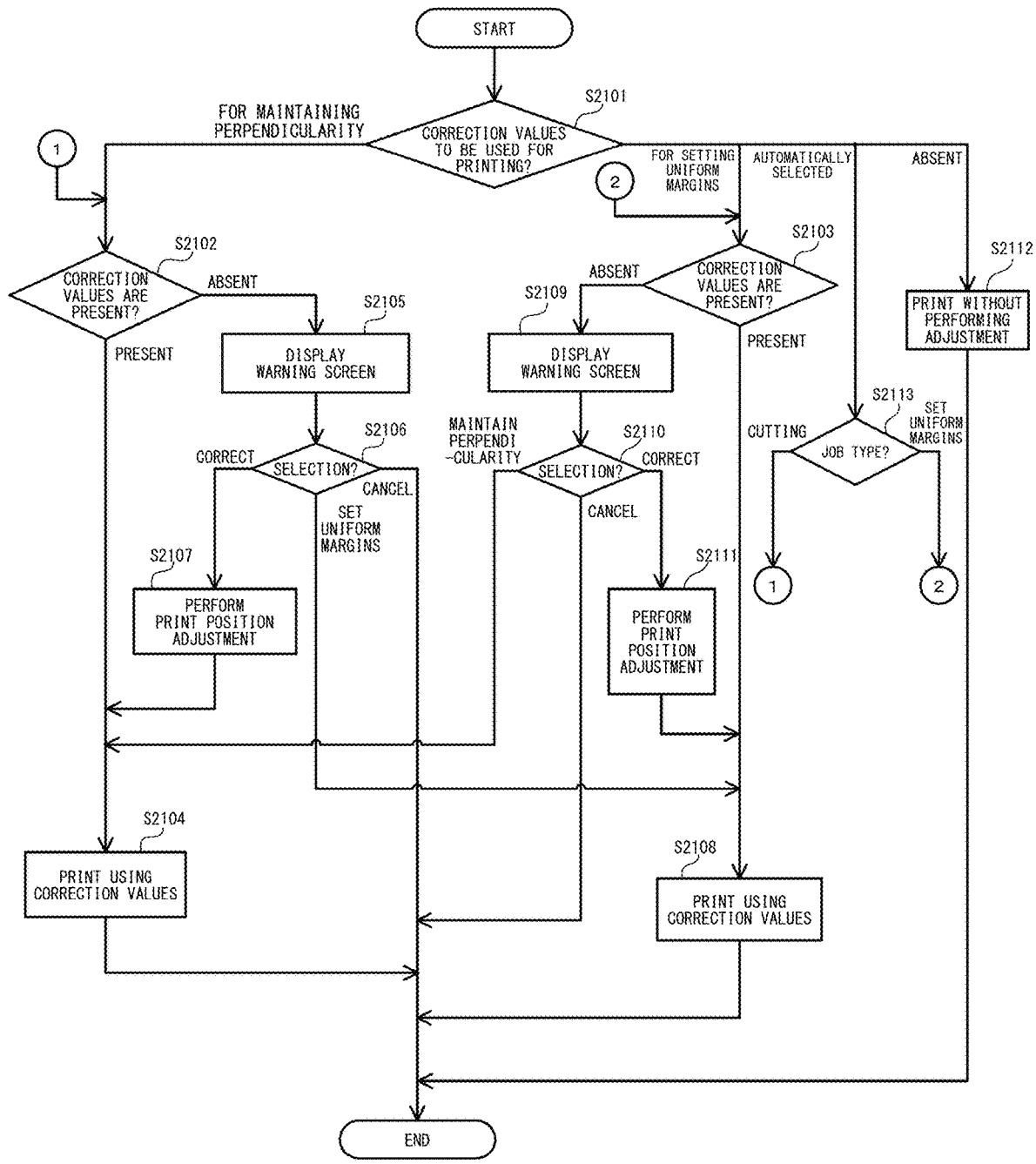
FIG. 21 is a flow chart for illustrating the image formation process including the print position adjustment process.

When a printed material is cut in the post-treatment, it is preferred to maintain a perpendicularity of the printed material. In addition, the printed material having uniform margins is visually attractive. In this process, in the consideration of the resulting printed material, the correction values are appropriately selected automatically. FIG. 21 is a flow chart for illustrating the image formation process including the print position adjustment process to be performed in such a process. This process is also started when the operator makes print settings in the print setting screen of FIG. 10 and presses the "OK" button 1006.

When receiving an instruction to perform the image formation process, the CPU 607 of the image forming apparatus 101 determines the print position adjustment method set in the "POSITION ADJUSTMENT" menu 1008 based on the job setting information (Step S2101). The process (Steps S2102 to S2112) performed when any of the first adjustment process, the second adjustment process, and the "NO ADJUSTMENT" process is set is the same as the process (Steps from S1802 to S1812) of FIG. 18. Therefore, a description of the process in such cases is omitted.

When "AUTO SELECT" is set as the print setting ("AUTOMATICALLY SELECTED" in Step S2101), the CPU 607 determines a job type included in the print job based on the print settings (Step S2113). The CPU 607 determines, based on the job type, the correction values to be used for the print position adjustment process. For example, when the job type includes cutting ("CUTTING" in Step S2113), the CPU 607 performs the process of Step S2102 and the steps subsequent thereto. For example, when the job type is full-page printing and margins are required to be uniform ("SETTING UNIFORM MARGINS" in Step S2113), the CPU 607 performs the process of Step S2103 and the steps subsequent thereto. Such settings are exemplary, and it may also be possible to allow setting of which ones of the correction values are to be used to perform printing every time a job is set.

According to Image Formation Process 3, the image forming apparatus 101 automatically determines the correction values to be used for the print position adjustment from among the correction values for the plurality of print positions based on the setting of the print job, performs the print position adjustment, and forms an image. Accordingly, appropriate print position adjustment is performed.

Image Formation Process 4

Figure 22:
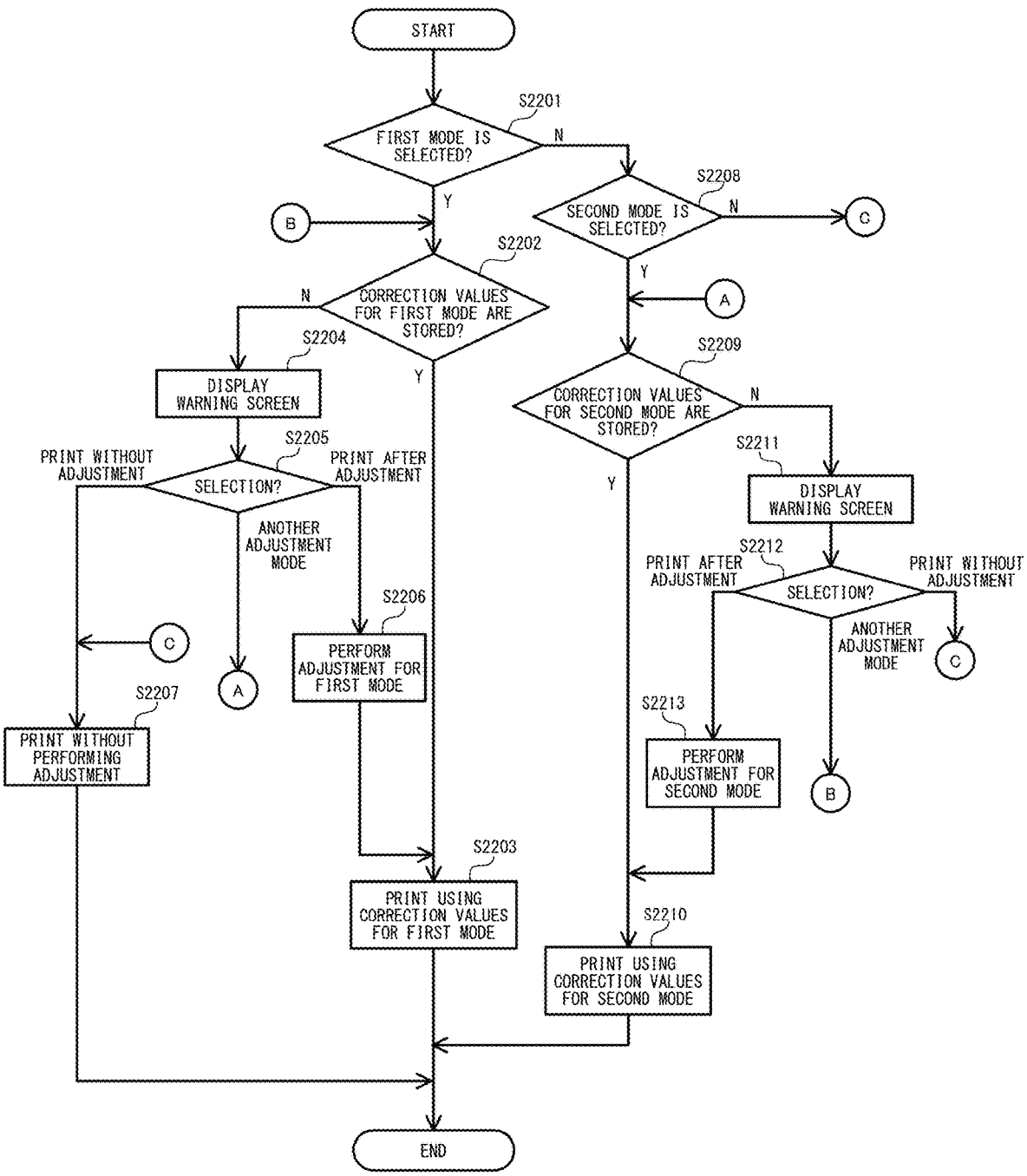
FIG. 22 is a flow chart for illustrating the image formation process including the print position adjustment process.

In the description of Image Formation Processes 1, 2, and 3, the first adjustment process and the second adjustment process are used as examples of the print position adjustment process. However, the print position adjustment process may also be selected from among a plurality of print position adjustment processes other than the first adjustment process and the second adjustment process. Consequently, the CPU 607 performs the process from among the plurality of print position adjustment processes based on the user instruction information. In the following description, the first adjustment process is referred to as "first mode process", and the second adjustment process is referred to as "second mode process". FIG. 22 is a flow chart for illustrating the image formation process including the print position adjustment process. The process is started when the operator makes print settings in the print setting screen of FIG. 10 and presses the "OK" button 1006. As a result, the information processing apparatus 102 transmits, to the image forming apparatus 101, an instruction to perform the image formation process including job setting information for a print job. In the print setting screen of FIG. 10, any of the first mode process and the second mode process is selectable. The operator selects any of the first mode process and the second mode process in the print setting screen and makes print settings.

When receiving the instruction to perform the image formation process, the CPU 607 of the image forming apparatus 101 determines, based on the job setting information, whether or not the first mode process is selected in the "POSITION ADJUSTMENT" menu 1008 (Step S2201). In the "POSITION ADJUSTMENT" menu 1008, any of the first mode process, the second mode process, and the "NO ADJUSTMENT" process, in which no print position adjustment is performed, can be set.

When the first mode process is selected ("Y" in Step S2201), the CPU 607 determines the presence or absence of the correction values for the first mode process (Step S2202). The CPU 607 refers to the sheet library of FIG. 12 and determines, depending on the type of sheet to be used for printing, the presence or absence of the correction values for the first mode process based on whether or not the corresponding correction values are set. When the correction values for the first mode process are present ("Y" in Step S2202), the CPU 607 adjusts the print positions based on the correction values for the first mode process and performs printing (Step S2203).

Figure 23:
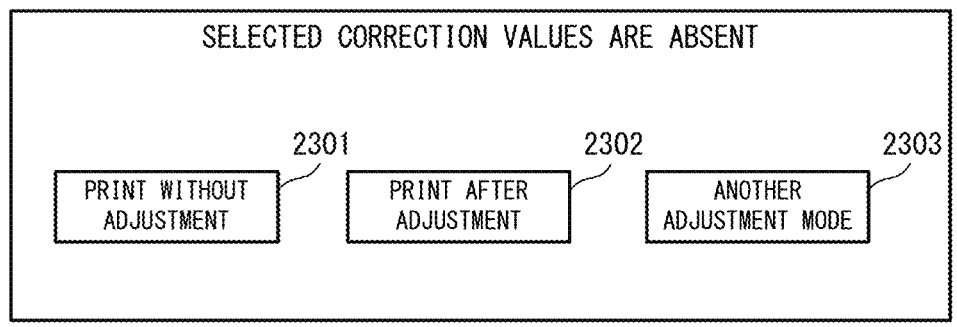
FIG. 23 is an explanatory diagram of the warning screen.

When the correction values for the first mode process are absent ("N" in Step S2202), the CPU 607 displays on the operation panel 323 the warning screen for notifying that the correction values for the first mode process have not been set (Step S2204). FIG. 23 is a diagram for illustrating an example of such a warning screen. In the warning screen, a button 2301 for performing printing without performing the print position adjustment, a button 2302 for performing printing after performing the print position adjustment, and a button 2303 for performing printing through use of another adjustment mode (second mode process) are provided. The warning screen is a screen for allowing the correction values (image processing conditions) corresponding to the process in the selected mode to be selected.

The CPU 607 determines which one of the buttons is selected by the operator in the warning screen (Step S2205). When the button 2301 is selected in Step S2205 ("PRINT WITHOUT ADJUSTMENT" in Step S2205), the CPU 607 performs printing without performing the print position adjustment (Step S2207).

When the button 2302 is selected in Step S2205 ("PRINT AFTER ADJUSTMENT" in Step S2205), the CPU 607 performs the print position adjustment in the first mode process (Step S2206). After the print position adjustment in accordance with the first mode process, the CPU 607 adjusts the print positions based on the correction values for the first mode process and performs printing (Step S2203).

When the button 2303 is selected in Step S2205 ("ANOTHER ADJUSTMENT MODE" in Step S2205), the CPU 607 performs the process to be performed when the second mode process is selected. This process is described later.

When the first mode process is not selected in the process of Step S2201 ("N" in Step S2201), the CPU 607 determines whether or not the second mode process has been selected in the "POSITION ADJUSTMENT" menu 1008 (Step S2208). When the second mode process has not been selected ("N" in Step S2208), the CPU 607 performs printing without performing the print position adjustment (Step S2207).

When the second mode process is selected ("N" in Step S2208), the CPU 607 determines the presence or absence of the correction values for the second mode process (Step S2209). The CPU 607 refers to the sheet library of FIG. 12 and determines, depending on the type of sheet to be used for printing, the presence or absence of the correction values for the second mode process based on whether or not the corresponding correction values for the second mode process are set. Even when the button 2303 is selected in the process of Step S2205, the CPU 607 performs the determination process of Step S2209. When the correction values for the second mode process are present ("Y" in Step S2209), the CPU 607 adjusts the print positions based on the correction values for the second mode process, and then performs printing (Step S2210).

When the correction values for the second mode process are absent ("N" in Step S2209), the CPU 607 displays on the operation panel 323 the warning screen for notifying that the correction values for the second mode process have not been set (Step S2211). The warning screen is the same as that of FIG. 23. The CPU 607 determines which one of the buttons on the warning screen has been selected by the operator (Step S2212).

When the button 2301 is selected in Step S2212 ("PRINT WITHOUT ADJUSTMENT" in Step S2212), the CPU 607 performs printing without performing the print position adjustment (Step S2207).

When the button 2302 is selected in Step S2212 ("PRINT AFTER ADJUSTMENT" in Step S2212), the CPU 607 performs the print position adjustment in the second mode process (Step S2213). After the print position adjustment in accordance with the second mode process, the CPU 607 adjusts the print positions based on the correction values for the second mode process and performs printing (Step S2210).

When the button 2303 is selected in Step S2212 ("ANOTHER ADJUSTMENT MODE" in Step S2212), the CPU 607 performs the process of Step S2202 to be performed when the first mode process is selected.

According to Image Formation Process 4, the image forming apparatus 101 performs the print position adjustment through use of the correction values specified by the operator from among the correction values for a plurality of modes, and forms an image. This process allows print position adjustment appropriate for a printed material to be performed depending on post-treatment, for example cutting.

According to at least one embodiment of the present disclosure, there is provided an image forming apparatus configured to allow different adjustment processes to be executed. Further, according to at least one embodiment of the present disclosure, it is possible to allow different adjustment processes to be executed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:
   an image forming unit configured to form an image on a sheet; and
   a controller configured to:
   control the image forming unit to form a test image on the sheet;
   obtain read data related to the test image on the sheet, the obtained read data being output from an image sensor;
   perform a first adjustment to adjust, regardless of a length of a margin of the sheet, a length of the image to be formed on the sheet in a certain direction based on the read data so that the length of an image forming area of the sheet in the certain direction becomes a target length; and
   perform a second adjustment to adjust a length of the image to be formed on the sheet in the certain direction based on the read data so that the length of the margin of the sheet becomes a target margin length.

2. The image forming apparatus according to claim 1, further comprising:
   a receiver configured to receive user instruction information,
   wherein the controller is configured to select an adjustment from among a plurality of adjustments, including the first adjustment and the second adjustment, based on the user instruction information.

3. The image forming apparatus according to claim 2, wherein:
   the controller includes an image processor configured to perform image processing, based on an image processing condition, on image data, and
   in a state where one of the first adjustment or the second adjustment is not selected based on the user instruction information, the controller causes the image processor to perform the image processing on the image data based on another image processing condition.

4. The image forming apparatus according to claim 3, further comprising:
   a storage unit configured to store a plurality of image processing conditions; and
   a notifier configured to notify, in a state where an image processing condition corresponding to the selected adjustment is not stored in the storage unit, that the selected adjustment is not to be performed.

5. The image forming apparatus according to claim 2, wherein:
   the controller includes an image processor configured to perform image processing on image data,
   upon the first adjustment being performed, the controller causes the image processor to perform the image processing on the image data based on a first image processing condition, and
   upon the second adjustment being performed, the controller causes the image processor to perform the image processing on the image data based on a second image processing condition.

6. The image forming apparatus according to claim 5, further comprising:
- a first reader, which includes an original table, on which the sheet having the test image formed thereon is to be placed, configured to read the test image on the sheet placed on the original table; and
- a second reader configured to read the test image on the sheet conveyed to the second reader, while conveying the sheet with the test image,
- wherein, when the first reader reads the test image, the controller generates the first image processing condition, and
- wherein, when the second reader reads the test image, the controller generates the second image processing condition.

7. The image forming apparatus according to claim 6, further comprising:
- a storage unit configured to store a plurality of image processing conditions; and
- a display,
- wherein, in a state where an image processing condition corresponding to the selected adjustment is not stored in the storage unit, the controller displays on the display a screen for selecting whether the image processing condition corresponding to the selected adjustment is to be generated.

8. The image forming apparatus according to claim 7, wherein, after the screen for selecting whether the image processing condition corresponding to the selected adjustment is to be generated is displayed on the display, in a state where a user instruction to generate the image processing condition corresponding to the selected adjustment is input to the controller, the controller causes the image forming unit to form the test image on the sheet.

9. The image forming apparatus according to claim 6, further comprising:
- a storage unit configured to store a plurality of image processing conditions; and
- a display,
- wherein, in a state where an image processing condition corresponding to the selected adjustment is not stored in the storage unit, the controller displays on the display a screen for selecting whether an adjustment different from the selected adjustment is to be performed.

10. The image forming apparatus according to claim 5, further comprising:
- a storage unit configured to store a plurality of image processing conditions; and
- a notifier configured to notify, in a state where the first image processing condition is not stored in the storage unit, that the first image processing condition is not stored, and to notify, in a state where the second image processing condition is not stored in the storage unit, that the second image processing condition is not stored.

11. The image forming apparatus according to claim 1, wherein the controller is configured to adjust, upon the first adjustment being performed, a length of the image to be formed on the sheet in another direction that intersects the certain direction, based on the read data so that a length of the image forming area of the sheet in the another direction becomes another target image length.

12. The image forming apparatus according to claim 1, wherein the controller is configured to adjust the length of the image formed on the sheet in the certain direction by adjusting a magnification of the image formed on the sheet in the certain direction.

13. The image forming apparatus according to claim 1, wherein the certain direction is a direction in which the sheet is conveyed to the image forming unit.

14. The image forming apparatus according to claim 1, wherein the certain direction is a direction crossing the direction in which the sheet is conveyed to the image forming unit.

15. The image forming apparatus according to claim 1, wherein:
- the controller includes an image processor configured to perform image processing on image data,
- upon the first adjustment being performed, the controller controls the image processor to perform the image processing on the image data based on a first image processing condition, and
- upon the second adjustment being performed, the controller controls the image processor to perform the image processing on the image data based on a second image processing condition different from the first image processing condition.

16. The image forming apparatus according to claim 1, further comprising a reading device including the image sensor and configured to read the test image on the sheet while the sheet is being conveyed.

* * * * *